(12) United States Patent
Izhak-Ratzin

(10) Patent No.: US 10,257,088 B2
(45) Date of Patent: Apr. 9, 2019

(54) VIRTUAL NETWORK OVERLAYS FOR MULTIPATH DATACENTERS

(71) Applicant: Robin Systems, Inc., San Jose, CA (US)

(72) Inventor: Rafit Izhak-Ratzin, Los Gatos, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 171 days.

(21) Appl. No.: 15/099,012

(22) Filed: Apr. 14, 2016

(65) Prior Publication Data

US 2017/0302572 A1    Oct. 19, 2017

(51) Int. Cl.
*H04L 12/24* (2006.01)
*H04L 12/26* (2006.01)
*H04L 12/721* (2013.01)
*H04L 12/931* (2013.01)

(52) U.S. Cl.
CPC .......... *H04L 45/70* (2013.01); *H04L 41/0896* (2013.01); *H04L 43/062* (2013.01); *H04L 49/70* (2013.01)

(58) Field of Classification Search
CPC ....... H04L 45/70; H04L 43/062; H04L 49/70; H04L 41/0896
See application file for complete search history.

(56) References Cited

U.S. PATENT DOCUMENTS

| | | | |
|---|---|---|---|
| 2015/0131989 A1* | 5/2015 | Syed .................. | H04L 41/0803 398/45 |
| 2016/0212068 A1* | 7/2016 | Sato ........................ | H04L 49/70 |
| 2017/0250901 A1* | 8/2017 | Saavedra ............ | G06F 9/45533 |

* cited by examiner

*Primary Examiner* — Michael A Keller
*Assistant Examiner* — Austin J Moreau
(74) *Attorney, Agent, or Firm* — David R. Stevens; Stevens Law Group

(57) ABSTRACT

Creation of a virtual overlay for a multipath network with tiered topology is disclosed. A virtual-node module may group network nodes connected within a common tier, which is initially the tier furthest from the core. This module may also group network nodes at a consecutive tier, closer to the core, that connect a pairs of groupings in the common tier by links between the common and consecutive tiers. Groupings with a common network node may be combined and designated as virtual nodes. A virtual-link module may sum bandwidths for network links between virtual-node pairs with nodes in both the common and consecutive tiers. A check module may combine virtual nodes and links and network nodes and links not yet virtualized in a graph, which it may check for a cycle. An iteration module may iterate both tiers toward the core, triggering further grouping, summing, and updating until no loop exists.

7 Claims, 18 Drawing Sheets

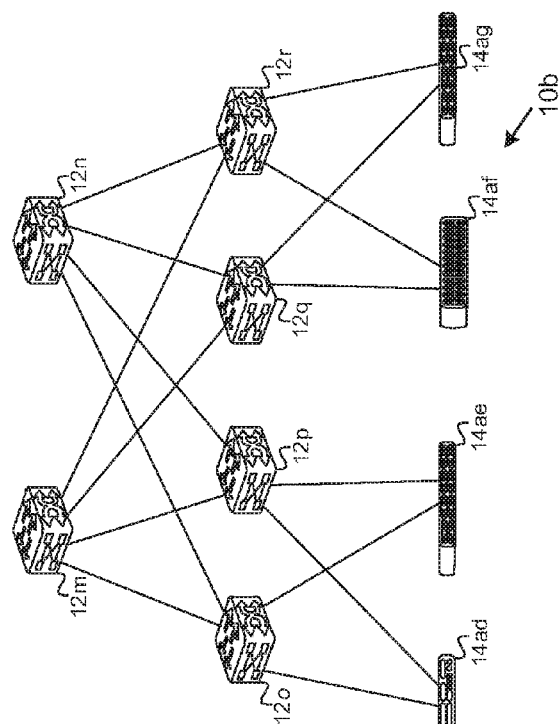
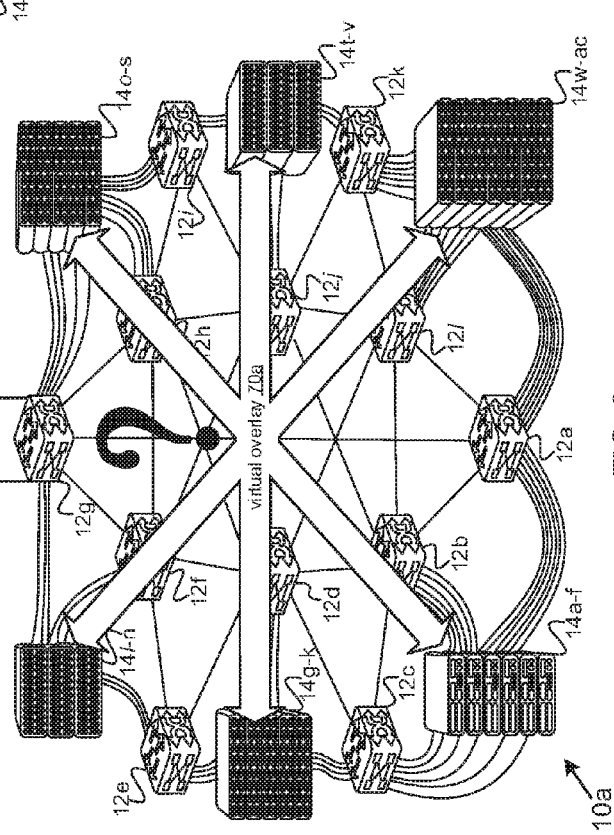
FIG. 3b
FIG. 3a

VIRTUAL NETWORK OVERLAYS FOR MULTIPATH DATACENTERS

FIELD OF THE INVENTION

This invention relates to datacenters and, more particularly, to virtualization of datacenter networks with tiered topologies.

BACKGROUND OF THE INVENTION

Datacenters are able to provide their large computing and/or storage resources through the networking of large numbers of computing and/or storage resources. As the amounts of data that datacenters are called upon to process and/or store continue to increase, the corresponding increases in traffic on datacenter networks can place strains on datacenters that can negatively impact performance. Traditionally, datacenters implement Internet Protocol (IP)/ Transmission Control Protocol (TCP) to handle the traffic on their networks.

Such approaches combine advantages of connectionless packet switching at lower layers, such as the datalink and/or network layers, with the advantages of connection-based switching at a higher layer, e.g., the transport layer. At lower layers, the connectionless, packet switching allows determinations to be made at individual network nodes about the path an individual packet describes through the datacenter. Multiple benefits may arise from the use of a connectionless, packet-switching protocol at one or more lower layers, such as the ability to engage in load balancing at individual network nodes, the fuller utilization of network links, fault tolerance, and/or improved bandwidth, among others.

At one or more higher layers, such as the transport layer, a suite of networking protocols in a datacenter may include a protocol, such as TCP, that may create an abstraction, such as a virtual circuit. The abstraction, or virtual circuit, between source and destination hosts in a network may provide some of the advantages of circuit switching. Such a protocol may, for example, buffer packets, reorder packets in their correct order, remove packet overhead, provide reliability measures like error detection and automatic repeat requests, and/or even provide measures to stabilize the bit rate. As a result, traffic in such datacenters can be described in terms of traffic flows between source and destination hosts. Within the foregoing environment, innovations may be made to accommodate the increasing demands of network traffic and/or improve management of network traffic in datacenters.

BRIEF DESCRIPTION OF THE DRAWINGS

In order that the advantages of the disclosures will be readily understood, a more particular description will be rendered by reference to specific embodiments illustrated in the appended drawings. Understanding that these drawings depict only typical examples and are not, therefore, to be considered limiting in scope, the invention will be described and explained with additional specificity and detail through use of the accompanying drawings, in which:

FIG. 3a is a schematic block diagram of a datacenter to which a logical/virtual network overlay (hereinafter "logical/virtual overlay," "virtual/logical overlay," "logical overlay," "virtual overlay," "logical network overlay," "virtual network overlay," or "overlay") may be applied to reduce a number of paths that packets may traverse in traveling in a common traffic flow, in an incomplete attempt to prepare the datacenter for informed bandwidth-allocations, while maintaining advantages of multipath routing;

FIG. 3b is a schematic block diagram of a datacenter with a tiered topology to which a logical/virtual overlay may be applied capable of providing single path routing for informed bandwidth-allocations, while maintaining advantages of multipath routing at lower layers, in accordance with examples;

DETAILED DESCRIPTION

It will be readily understood that the components of the present invention, as generally described and illustrated in the figures herein, can be arranged and designed in a wide variety of different configurations. Thus, the following more detailed description, as represented in the figures, is not intended to be limiting in the scope, as claimed, but is merely representative of certain examples. The presently described examples will be best understood by reference to the drawings, wherein like parts are designated by like numerals throughout. In some cases, particular instances of an element may be identified with a number followed by a letter, indicating differing instances of the element with the same attributes, or variations on those attributes. References to elements by number only may refer more generally to an example representative of a class of such elements.

Figure 1:
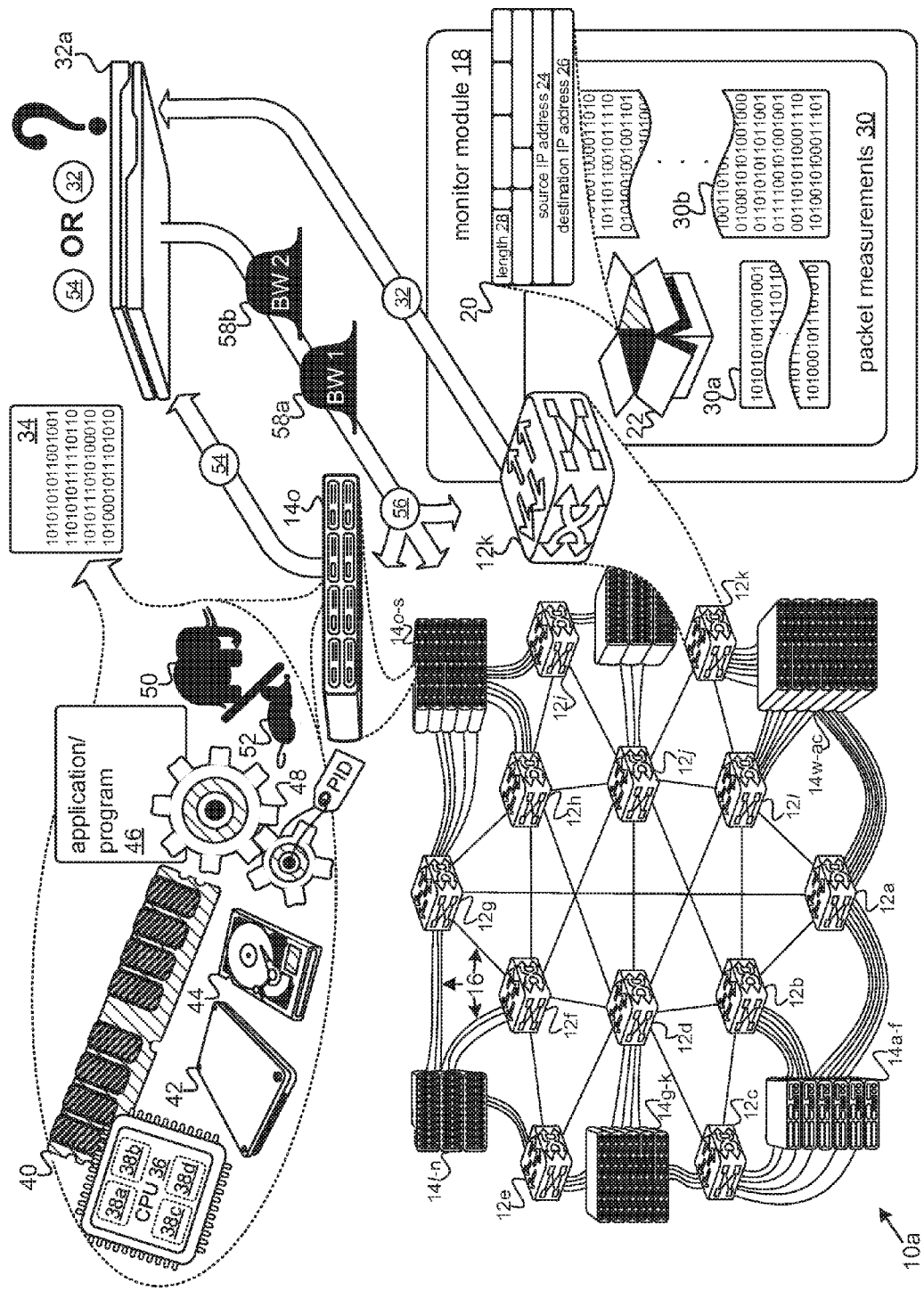
FIG. 1 is a schematic block diagram of a datacenter contrasting traditional approaches to collecting traffic data, from intermediate, network nodes, with innovative approaches to collecting traffic data from end hosts, together, potentially, with data related to services provided by the datacenter, by a controller operable to use the collected data to improve network traffic with informed bandwidth allocations.

Referring to FIG. 1, a datacenter 10a is depicted with intermediate nodes 12a-l, such as a switch, a router, a hub, a load balancing server, a mirror server, and/or the like. The datacenter 10a is also depicted with various end hosts 14a-ac operable to send and/or to receive data from and/or to one another. Also, for purposes of this application, the term 'network node' 12/14 may refer to an intermediate node 12 or a host 14. The various hosts 14a-ac and/or intermediate nodes 12a-l may be connected by network links 16, which may communicate data between the hosts and/or intermediate nodes that they connect in a bidirectional or unidirectional manner, depending on the example.

An enlarged view of one of the intermediate nodes 12k is depicted, together with a monitoring module 18 residing thereon. Such a monitoring module 18 is commonly operable to read the header 20 of a packet 22 traversing the intermediate node 12k. Consequently, the monitoring module 18 is limited with respect to the kinds of data it can collect to data available in a header 20. Examples of such categories of data may include source, Internet Protocol (IP) addresses 24, destination, IP addresses 26, and total lengths 28 for the packets 22 examined. However, the limited categories of data available in such headers 20 do not extend to significant types of resources and/or categorizations involved in the implementation of datacenter tasks. Furthermore, since the monitoring module 18 collects and/or stores data transmission information as packet measurements 30 at a packet level of granularity, the monitoring module 18 can store enormous amounts of data with its packet measurements 30, which may or may not be stored in groups 30a-b by the sources and/or destinations from and/or to which the packets 22 are sent.

A centralized collector 32a and/or controller 32a (herein after "collector," "controller," and/or "collector/controller"), may be used to aggregate traffic data for the datacenter 10a. For example, the centralized collector/controller 32a may poll 32 the intermediate node 12k and/or monitoring module 18, together with additional nodes/monitoring modules 12/18, to collect a data set tracking data transmissions across the datacenter 10a. In cases where path determinations are made for individual packets 22 at individual intermediate nodes 12, a complete characterization of datacenter traffic can involve packet-level collections at individual intermediate nodes 12a-l.

When data is collected and/or aggregated for each packet 22, or at the packet level, the resultant data set can be enormous and/or require the transmission of large amounts of reporting data. Consequently, such data sets are problematic for generating practical, useful, and/or relevant traffic statistics. Additionally, polling 32 of intermediate nodes 12, as opposed to the end hosts 14 from which packets 22 originate, inherently introduces delays. Furthermore, such approaches require monitoring capabilities almost uniformly across the intermediate nodes 12 of a datacenter 10, capabilities that are expensive and not present on all potential equipment.

Furthermore, since monitoring modules 18 at intermediate nodes 12a only have access to information within packets 22s, they are restricted to the collection of information about the operations of a datacenter 10a when the datacenter 10a is viewed from the perspective of a network. However, the networking capabilities of datacenters 10 are secondary to the computing, server, and/or storage functionalities they provide. Information about such functionalities, or operational data 34, is not traditionally provided within the packets 22 monitored at intermediate nodes 12. Rather, such operational data 34 resides at the end hosts 14, with the hardware and/or software elements where it is produced.

By way of providing non-limiting examples, an exemplary set of hardware elements producing operational data 34 at hosts 14 may include: one or more Central Processing Units (CPUs) 36, with one or more cores 38a-d; one or more Random Access Memory (RAM) units 40; one or more Solid State Drives 42; and/or one or more Hard Disk Drives (HDDs) 44, among other potential hardware elements. Non-limiting examples of a set of software elements producing operational data 34 at hosts 14 may include one or more applications 46 running at the hosts 14, together with corresponding processes 48, with their corresponding Process IDentifiers (PID), among other potential software elements. Additional forms of operational data 34 may also be collected at datacenters 10. Additional discussion of the collection of operational data is provided in the United States patent application for Rarit Izhak-Ratzin, et al., with application Ser. No. 14/886,638 and filed on Oct. 19, 2015, entitled "Providing a Data Set for Tracking and Diagnosing Datacenter Issues," which is incorporated herein by reference.

Information about traffic flows originating at various hosts 14, may also be helpful. As discussed above, although at one or more lower layers, intermediate routers 12 may make independent routing decisions for individual packets 22, regardless of whether those packets 22 are sent from a common host to a common host 14, the implementation of abstractions, such as a virtual circuit, by one or more higher networking protocols allows sets of packets to identified as traffic flows. For purposes of this application, a traffic flow is defined as a series of interrelated frames, and/or packets 22, sent from a common source to a common destination in a datacenter 10.

With respect to traffic flows, for example, the traffic to be sent from and to hosts 14 within a datacenter 10 may manifest as a type of traffic known as "big-data" traffic. "Big-data" traffic can be characterized within one of two categories, namely, elephant flows 50 and mice flows 52. Mice flows 52, which make up the majority of traffic by number, are classified by their relatively short duration times and/or the relatively small amounts of data they transfer. Conversely, elephant flows 50, which make up the majority of traffic by the amount of traffic transferred, are classified by their relatively long duration times and/or the relatively large amounts of data they transfer. In addition to traffic data and/or operational data 34, a controller 32 could use information about traffic flows, such as whether they can be considered elephant flows 50 and/or mice flows 52, to analyze and/or improve network traffic. Additional discussion of the classification of traffic flows as elephant flows 50 is provided in the United States patent application for Rarit Izhak-Ratzin, et al., with Publication Number 2015/0071072, entitled "Traffic Flow Classification," which is incorporated herein by reference.

By collecting 54 data from hosts 14, as opposed to intermediate nodes 12, a controller 32 may obtain advantages with respect to the analysis and/or control of datacenter traffic. Additional discussion of the collection of data at hosts 14 is provided in the United States patent application for Rarit Izhak-Ratzin, et al., with Publication Number 2015/0074264, entitled "Traffic Statistic Generation for Datacenters," which is incorporated herein by reference. By way of non-limiting examples of the advantages of collecting data and/or information at hosts 14, traffic data may be obtained without delay at a traffic-flow level of granularity, which reduces the amount of traffic data to be transferred and/or processed for analysis. Additionally, operational data 34 could be collected, together with traffic data, at the hosts 14 where it is available. Also, additional information, such as about the classification of traffic flows may be collected.

The controller 32 may then analyze and/or oversee analysis of the data and/or information collected 54 from hosts 14 within the datacenter 10*a*. Furthermore, the controller 32 may use the data and/or information, prior to and/or after analysis, to allocate 56 bandwidths 58*a*-*b* for utilization of the hosts 14*a*-*ac* within the datacenter 10*a*. By allocating 56 bandwidths 58, based on data and/or information collected 54 from hosts 14, a controller 32 can coordinate and improve the performance and/or capacity of the datacenter 10*a* in terms of its ability to handle traffic and/or its overall function. However, the ability of a controller 32 to coordinate and/or fine tune the datacenter's performance may be hampered by the open-ended nature of the paths over which individual packets 22 from a common traffic flow may be routed, as discussed with respect to the following figure.

Figure 2:
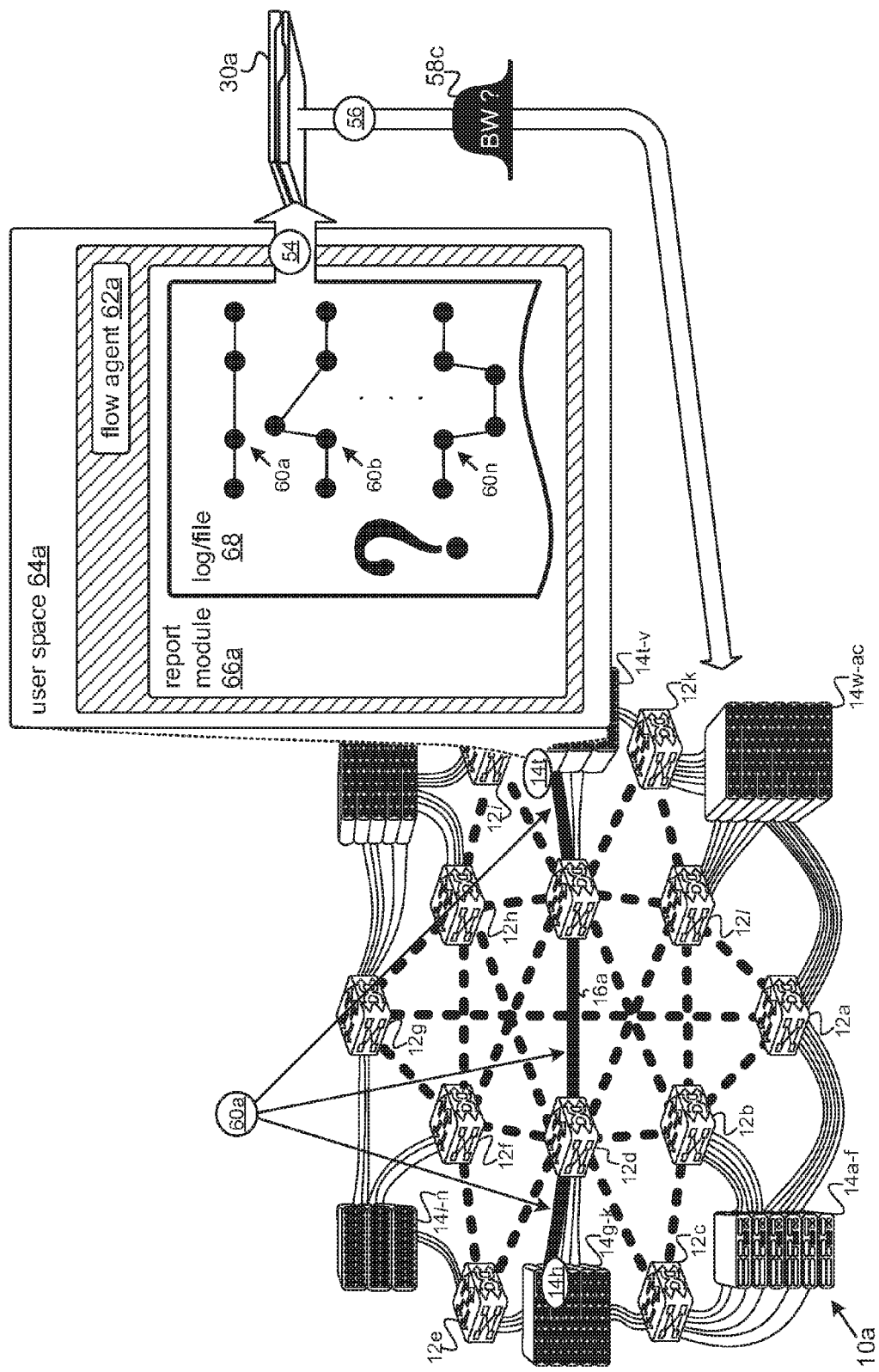
FIG. 2 is a schematic block diagram of a datacenter, highlighting a large number of paths that packets may traverse in traveling from a common source to a common destination in a common traffic flow within a datacenter, realizing advantages of multipath routing, but presenting an obstacle to innovations that would collect traffic data to improve datacenter traffic through informed bandwidth-allocations.

Referring to FIG. 2, the same datacenter 10*a* is again depicted. However, the present depiction highlights the large number of paths packets 22 from a common traffic flow may traverse within the datacenter 10*a*. Although the packets 22 in the traffic flow may have a common source host 14*t* and a common destination host 14*h*, different packets 22 in the corresponding traffic flow may travel many different paths as routing decisions are made independently at intermediate nodes 12*a*-*l*. Statistically, there may be a higher chance that a given packet 22 traverses a shortest path 60*a*, indicated by the thick black line, including intermediate nodes 12*j* and 12*d*. However, in point of fact, any given packet 22 in the traffic flow may traverse any of the nodes 12*a*-*l*, as denoted by the thick, dotted lines.

Hence, a flow agent 62*a* at the source host 14*t*, such as within user space 64, may be limited in the information it can provide 54 about paths taken by traffic to the controller 32*a*. For example, the flow agent 62*a* may include a report module 66 that may generate a log, file, or the like 68, which may be carried in one or more packets 22 to the controller 32*a*. However, although the report module 66 can provide information about an amount of traffic to be transmitted in a traffic flow originating at the source host 14*t*, it cannot indicate specific links 16 and/or nodes 12 that will experience the resultant traffic.

As depicted in the log/file 68 for the traffic flow, some packets 22 may take the direct path 60*a*. One or more of the other packets 22 in the traffic flow may take a first indirect path 60*b* from source host 14*t* through intermediate nodes 12*j*, 12*f*, and 12*d*, and, finally, to destination host 14*h*. Yet another set of packets 22 may take an $n^{th}$ indirect path 60*n* over the intermediate nodes 12*j*, 12*l*, 12*b*, and 12*d*. Furthermore, various additional sets of packets 22 may take various other potential paths 60.

Consequently, any allocated bandwidths 58 by the controller 32*a* to hosts 14 will be made with incomplete information, being best guesses and/or estimates, as indicated by the question mark in the allocated bandwidth 58*c*. The controller 32*a* may make estimates based on various factors, such as an assumption in favor of the direct path 60*a*. However, any number of considerations may undercut such assumptions. For example, the direct path 60*a* in FIG. 2 traverses a central datacenter link 16*a* between nodes 12*j* and 12*d*, resulting in a probability that it will be shared with additional traffic flows, resulting in node 12*d* potentially routing packets 22 in more indirect paths 60.

Hence, in maintaining advantages of multipath routing, it would be desirable to provide information to the controller 32*a* about internet resources that play a role in transferring various traffic flows. Such information could provide more accurate and/or more finely tuned bandwidth allocations 58. One potential approach to providing such information is explored with respect to the following figure.

Referring to FIG. 3*a*, again the datacenter 10*a* is depicted. However, a virtual, or logical overly 70*a* (hereinafter "logical/virtual overlay," "virtual/logical overlay," "logical overlay," "virtual overlay," "logical network overlay," "virtual network overlay," or "overlay") for the datacenter 10a is also depicted. As discussed in greater detail below, advantages of multipath routing decisions made by individual intermediate nodes 12 may be maintained with network protocols at lower levels. However, additional advantages may be realized at higher layers through the generation of a virtual/logical overlay 70.

Such a logical/virtual overlay 70 may restrict the number of paths 60 and/or resources that may be employed to pass traffic for respective virtual links and/or nodes in a logical/virtual overlay 70. However, a logical/virtual overlay 70 may maintain advantages of multipath routing decisions made by individual intermediate nodes 12 by including enough nodes 12, links 16, and/or resources within given virtual links and/or nodes to allow multiple potential paths 60. At the same time, since the nodes 12, links 16, and/or resources are restricted to a subset of the total available nodes 12, links 16, and/or resources in the datacenter 10, a flow agent 62 may provide more information about nodes 12, links 16, and/or resources that may be effected by a given traffic flow by providing information about the virtual links and/or nodes, within the virtual/logical overlay 70, being used by the traffic flow.

However, should multiple virtual/logical links and/or nodes in the virtual/logical overlay 70 share and/or reuse nodes 12, links 16, and/or resources, the value of the information that can be provided to a controller 32 is reduced, for the same reasons that multipath routing in a datacenter 10 without the overlay 70 limits the information that can be obtained about traffic from hosts 14. Furthermore, as indicated by the large question mark, questions arise about which intermediate nodes 12, links 16, and/or resources should be assigned to which virtual/logical links and/or nodes within the logical/virtual overlay 70. Such issues may be addressed by deploying a datacenter 10 as a hierarchical, of tiered datacenter 10, and applying a virtual/logical overlay 70 thereto, as discussed in greater detail below.

Referring to FIG. 3b, another datacenter 10b with a hierarchical, or tiered topology is depicted. A logical/virtual overlay 70 may be applied to such a topology. As discussed below, a logical/virtual overlay 70 may be generated to provide the single-path routing within the overlay 70 that a controller 32 can use to full advantage for informed, centralized bandwidth-allocations. At the same time, a tiered datacenter 10 may maintain advantages of multipath routing at lower layers.

Figure 4:
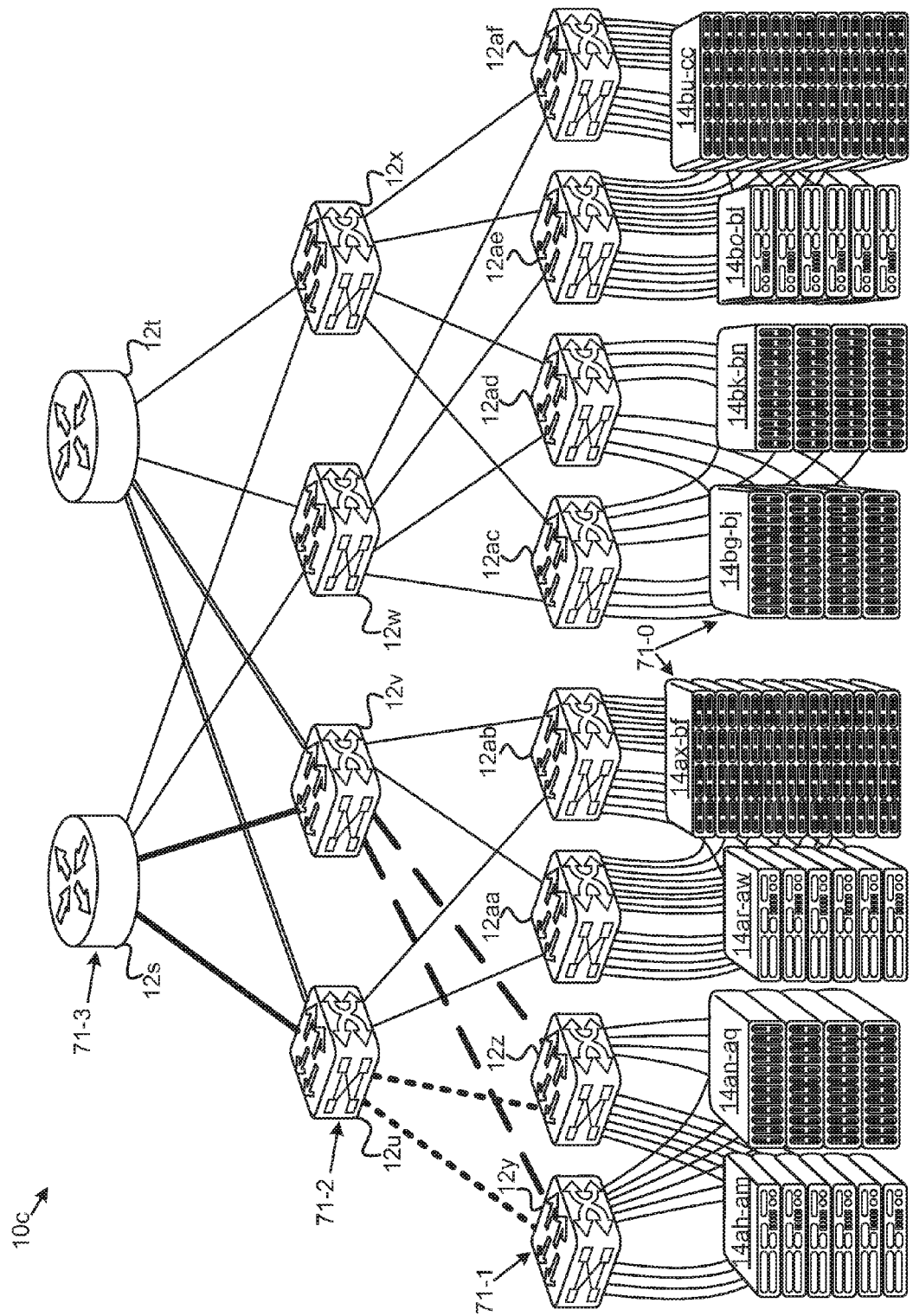
FIG. 4 is a schematic block diagram of a datacenter with a tiered, or hierarchical, topology, in accordance with examples.

Referring to FIG. 4, another example of a datacenter 10c with a tiered, or hierarchical, topology is depicted. Non-limiting examples of such tiered datacenters 10 may include datacenters 10 with a leaf-spine topology (cos network) and/or a fat tree topology. The example depicted in FIG. 4 has a host tier 71-0 and three network tiers 71-1 to 71-3. However, any number of different tiers 71 are possible.

In examples with three network tiers 71-1 to 71-3, the first network tier 71-1 may correspond to an access tier 71-1, which may include intermediate nodes 12y-af that provide connections to the various hosts 14ah-cc in the datacenter 10c. The second network tier 71-2 may correspond to a distribution tier 71-2. And, the third network tier 71-3 may correspond to a core tier 71-3.

As can be appreciated, more than one path 60 may be taken to get from one network node 12/14 to another network node 12/14 within the datacenter 10c. As a result, such tier datacenters 10 can maintain the advantages of multipath routing, such as redundancy and load balancing. For example, a packet 22 may travel from a first intermediate source node 12y to a second intermediate destination node 12z either via a third intermediate node 12u, as indicated with the shortly spaced dashed lines, or a fourth intermediate node 12v, as indicated with the more greatly spaced dashed lines. Similarly, a packet 22 may travel from a first intermediate source node 12u to a second intermediate destination node 12v either via a third intermediate node 12s, as indicated by the thick black lines, or a fourth intermediate node 12t, as indicated by the double lines.

Although multiple path options can be harnessed by lower layers to advantage, they are problematic to the collection of data traffic from hosts 14ah-cc in the datacenter 10c, for reasons explained above. To address these concerns, a virtual/logic overlay 70 may be applied. An exemplary virtual/logic overlay 70 for the datacenter 10c is discussed with respect to the following figure.

Figure 5:
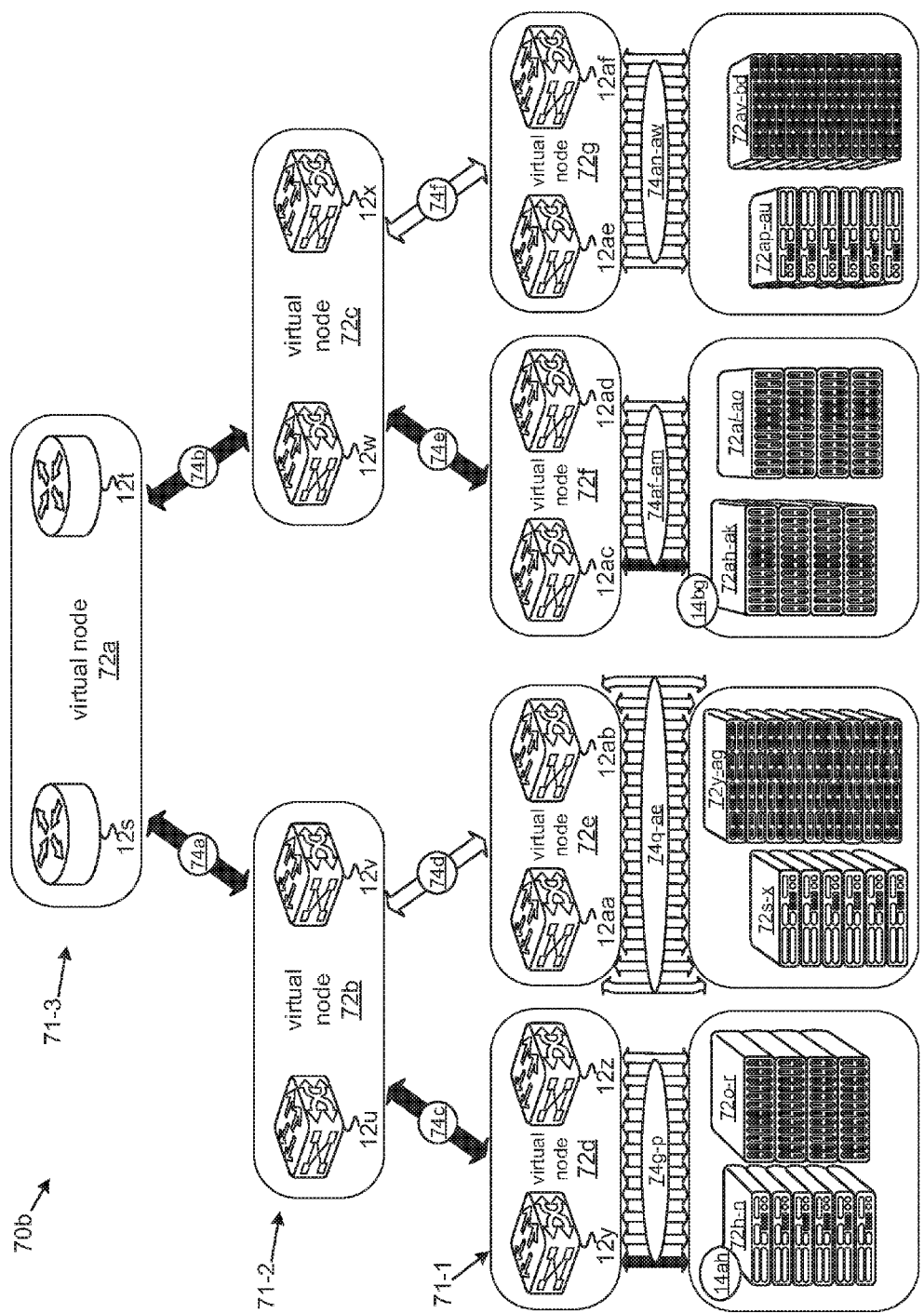
FIG. 5 is a schematic block diagram of a logical/virtual overlay providing single-path routing at an elevated layer for utilization by a controller for bandwidth allocations within a datacenter with a tiered topology, in accordance with examples.

Referring to FIG. 5, a logical/virtual overlay 70b for the tiered datacenter 10c is depicted. The virtual/logical network overlay 70b may include a set of virtual nodes 72a-bd and/or a set of virtual links 74a-aw. For purposes of this application, a 'set,' or 'group,' may have any number of elements, including a single element and no elements. The groups/virtual/logical nodes 72a-bd are depicted as including corresponding network nodes 12s-af/14ah-cc.

The intermediate nodes 12y-af of the access tier 71-1 are combined in four virtual nodes 72d-g: virtual node 72d including network nodes 12y and 12z; virtual node 72e including network nodes 12aa and 12ab; virtual node 72f including network nodes 12ac and 12ad; and virtual node 72e including network nodes 12ae and 12af. Furthermore, although each of the hosts 14ah-cc corresponds to a separate logical node 72h-bd, hosts 1414ah-cc are grouped in boxes, i.e.: hosts 14ah-aq; 14ar-bf; 14bg-bn; and 14bo-cc; that are connected to common virtual nodes 72d-g, for ease of illustration. Hence, each host 14ah-cc is also a virtual node 72h-bd and has a single, bidirectional, virtual link 74g-aw to a single virtual/logical node 72d-g in the access tier 71-1.

Similarly, each virtual node 72d-g in the access tier 71-1 has a single, bidirectional virtual link 74c-f to a single virtual node 72b-c in the distribution tier 71-2. The network nodes 12u-x of the distribution tier 71-2 are divided between two virtual nodes: virtual nodes 72b and 72c. At the core tier 71-3, a single virtual node 72a includes both network nodes 12s and 12t. Virtual nodes 72b and 72c from the distribution tier 71-2 each having a single virtual link, 74a and 74b, respectively, to the core-tier virtual node 72a.

Consequently, a single path of virtual nodes 72 and links 74 exists between each pair of hosts 14 within the overlay 70b. For example, the sole path from host 14ah to host 14bg, and vice versa, within the virtual overlay 70b, traverses virtual nodes 72d, 72b, 72a, 72c, and 72f, and virtual links 74g, 74c, 74a, 74b, 74e, and 74af, which are darkened. Since each source-destination pair has a single path assigned thereto by the overlay 70b, a controller 32 may collect/receive 54 complete path information for a traffic flow and its packets 20 based on the identity of the source and destination hosts 14ah, 14bg for that traffic flow. Also, since the identity of the source and destination hosts 14ah, 14bg is available at hosts 14 originating traffic flows, the controller 32 may collect/receive 54 complete path information from the host 14ah.

As a result, the controller 32 may allocate 56 bandwidths 58 to more fully utilize resources and/or avoid bottlenecks. Such allocations 56 may be used to implement additional performance capabilities, such as, without limitation, quality of service guaranties. However, although the various network nodes 12/14 and network links 16 are uniquely assigned to the virtual nodes 72a-bd and/or virtual links 74a-aw of the virtual/logical overlay 70b for a higher-layer protocol, the variety of network nodes 12/14 potentially in a single virtual node 72 and/or the variety of network links 16 potentially in a single virtual link 74 continue to allow for multiple paths at lower layers, within a single path of the overlay 70b.

Accordingly, the advantages of multipath routing are maintained. What is more, in a tiered datacenter 10c, the network nodes 12 and network links 16 that could be traversed, according to the various possible paths 60, from a particular source host 14 to a particular destination host 14 can be included in the virtual nodes 72 and virtual links 74 of the corresponding single path of the overlay 70b. Hence, advantages of multipath routing can be maintained at lower layers without being diminished. The generation of virtual/logical overlays 70 for tiered datacenters 10 is discussed below after a brief introduction to potential elements utilized by the controller 32 and a discussion of the potential hosts 14 to which they may apply.

Figure 6:
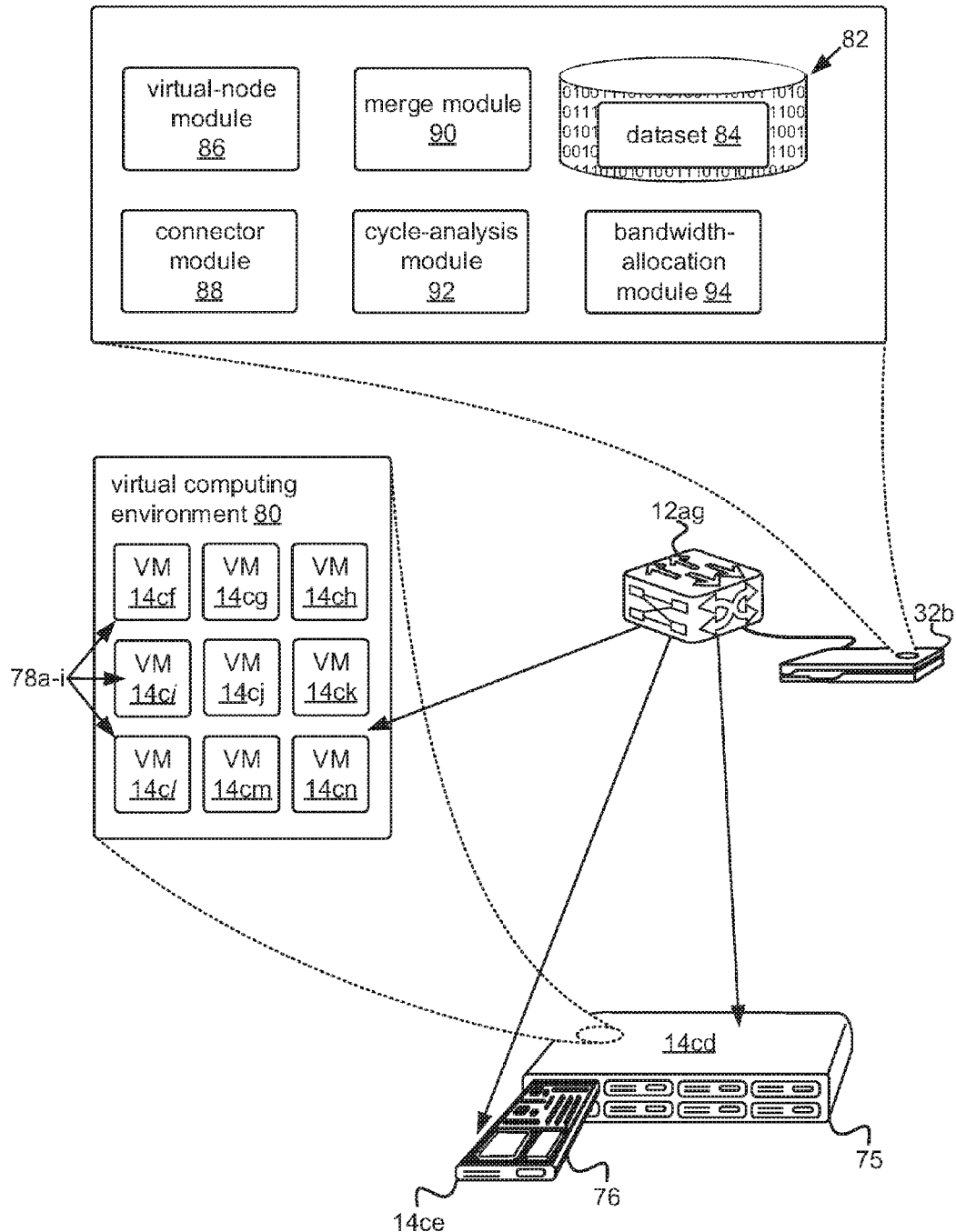
FIG. 6 is a schematic block diagram of various entities that may, or may not, serve as hosts in a datacenter network for which single path routing may be provided by a logical/virtual network overlay, together with resources on which a controller may rely in creating the logical/virtual overlay and/or using the logical/virtual overlay to make bandwidth assignments, in accordance with examples.

Referring to FIG. 6, a variety of potential hosts 14 are depicted for potential designation as virtual nodes 72 for a virtual overlay 70. Accordingly, varying levels of granularity for single path routing may be implemented, depending on the entities that are designated as hosts 14 for purposes of the virtual overlay 70. For example, a machine 75 may be designated as a host 14cd. Potentially, an individual blade server 76 within the machine 75 may be designated as a host 14ce. Also, Virtual Machines (VMs) 78a-i within a virtual computing environment 80 may be designated as hosts 14cf-cn.

In some examples, hosts 14 may be designated at a common level of granularity, such as, without limitation, the level of a machine 75, an individual server 76, or a VM 78. In other examples, a single virtual overlay 70 might include several different levels of granularity at different locations in the datacenter 10. Also depicted are several elements that may be included with and/or communicatively coupled to the controller 32b.

These elements may include a database 82 with a dataset 84, a virtual-node module 86, a connector module 88, a merge module 90, a cycle-analysis module 92, and/or a bandwidth-allocation module 94. As can be appreciated, much of the structure and functionalities discussed throughout this application, may be handled by modules. Modules may take the form of an entirely hardware embodiment, an entirely software embodiment (including firmware, resident software, micro-code, etc.), or an embodiment combining software and hardware aspects. Furthermore, aspects of the presently discussed subject matter may take the form of a computer program product embodied in any tangible medium of expression having computer-usable program code.

With respect to software aspects, any combination of one or more computer-usable or computer-readable media may be utilized. For example, a computer-readable medium may include one or more of a portable computer diskette, a hard disk, a Random Access Memory (RAM) device, a Read-Only Memory (ROM) device, an Erasable Programmable Read-Only Memory (EPROM or Flash memory) device, a portable Compact Disc Read-Only Memory (CDROM), an optical storage device, and/or a magnetic storage device. In selected embodiments, a computer-readable medium may comprise any non-transitory medium that may contain, store, communicate, propagate, or transport the program for use by or in connection with the instruction execution system, apparatus, or device.

Computer program code for carrying out operations of the present invention may be written in any combination of one or more programming languages, including an object-oriented programming language such as C++, and conventional procedural programming languages, such as the "C" programming language, or similar programming languages. Aspects of a module that are implemented with software may be executed on a micro-processor, Central Processing Unit (CPU) and/or the like. Any hardware aspects of the module may be implemented to interact with software aspects.

Returning to the controller 32 and by way of providing a brief overview, a system for generating a virtual overlay 70 for a datacenter 10 may include both a database 82 and a controller 32b. The database 82, which may reside on a physical storage medium, may maintain a dataset 84 capable of characterizing a tiered datacenter topology, which may accommodate multipath routing, as a graph. The graph may be generated from a set of vertices representing network nodes 12/14 and a set of edges representing network links 16 recorded in the dataset 84.

The controller 32 may be communicatively coupled to the datacenter 10 and may include memory and one or more processors. The controller 32 may utilize the memory and/or processor(s) to generate and/or access the graph from the dataset 84. From the graph, the controller 32 may create a set of virtual nodes 72 by assigning network nodes 12/14 to virtual nodes 72. Additionally, the controller 32 may create a set of virtual links 74 between the virtual nodes 72 by summing bandwidths of network links 16 directly connected to network nodes 12/14 in pairs of virtual nodes 72. With the set of virtual nodes and the set of virtual links, the controller 32b may generate a virtual overlay 70 that may assign a single path between individual pairs of source hosts 14 and destination hosts 14.

In some examples, a virtual-node module 86 may be provided within, and/or communicatively coupled to, the controller 32. The virtual-node module 86 may be operable to generate a set of virtual nodes from network nodes 12/14. In doing so, the virtual-node module 86 may begin at a tier 71-0 most removed from a core tier 71-3 of a datacenter 10 and select a reference tier and a second tier. The second tier may be defined relative to the reference tier and may be one step higher on a tiered topology of the datacenter 10 in the direction toward the core tier 71-3.

The virtual-node module 86 may group one or more network nodes 12/14 from the second tier, where a path 60 that includes the network node(s) 12/14 may be described through the datacenter 10 from a corresponding, source node 12/14/72, which may be a single network node 12/14 or group of network nodes 12/14, such as, without limitation, a virtual node 72, in the reference tier. Such a path 60 connects the source node 12/14/72 to a corresponding, destination node 12/14/72, which may be a single network node 12/14 or group of network nodes 12/14, such as, without limitation, a virtual node 72, in the reference tier. In other words, the virtual-node module 86 may group network nodes 12/14 from the second tier in a common virtual node 72 that may be used to create a connection between a common source node 12/14/72 and a common destination node 12/14 in the reference tier that correspond to the common virtual node 72. Because of the multipath routing allowable by the datacenter 10, multiple network nodes 12 from the second tier may be included in the corresponding virtual node 72.

Also, in some examples, a connector module 88 may be included within, and/or communicatively coupled to, the controller 32. The connector module 88 may be operable to generate a virtual node 72 from network nodes 12/14 from the reference tier that share a network link. Furthermore, the reference tier and the second tier may be subject to reassignment after being used to generate a set of virtual nodes from network nodes 12/14 in the second tier and/or the reference tier.

Additionally, some examples may include a merge module 90 within, and/or communicatively coupled to, the controller 32. The merge module 90 may be operable to merge, from the set of virtual nodes, multiple virtual nodes 72 sharing one or more common network nodes 12/14 into a common virtual node 72 replacing the multiple virtual nodes 72 sharing the one or more common network nodes 12/14 in the set of virtual nodes.

A cycle-analysis module 92 may be included, in some examples, within the controller 32, and/or communicatively coupled to, the controller 32. The cycle-analysis 92 module may be operable to generate a composite graph. The cycle analysis 92 module may generate the composite graph from a composite set of vertices, including vertices for the set of virtual nodes and vertices from the set of vertices assigned to network nodes 12/14 in a set of tiers for which virtual nodes 72 have not been created. Also, the composite graph may use a composite set of links, including edges for the set of virtual links 74 and the set of edges assigned to network links 76 connected to at least one network node 12/14 in the set of tiers for which virtual nodes 72 have not been created. Once generated, the cycle-analysis module 92 may analyze the composite graph for a cycle in the composite graph.

Additionally, the cycle-analysis module 92 may be operable, in response to detection of a cycle, to change the reference tier to the second tier and to move the second tier one additional tier toward the core tier 71-3. The cycle-analysis module 92 may also trigger creation of one or more additional virtual nodes 72 and/or one or more additional virtual links 74. The one or more additional virtual nodes 72 and/or virtual links 74 may be created by iterating through steps described above until the cycle-analysis module 92 no longer finds a cycle, or loop. Once the cycle-analysis module 92 no longer finds a cycle, or loop, the generated set of virtual nodes and set of virtual links may be combined to create the virtual/logical overlay 70. The virtual/logical overlay 70 may include a single path between each potential pair of source and destination hosts 14.

Furthermore, some examples of the system may include multiple flow agents 62, with each flow agent 62 residing at a host 14. The flow agents 62 may be operable to serve as a source for a traffic flow in the datacenter and, hence, operable to control a bandwidth of the traffic flow from the source host 14 at which it resides. A bandwidth-allocation module 94 within, and/or communicatively coupled to, the controller 32b may also be included.

The bandwidth-allocation module 94 may be operable to make bandwidth allocation assignments 56 to the multiple flow agents 62 without exceeding available bandwidth on network links 16 by referencing bandwidths 58 for virtual links 74 in the virtual network overlay 70, as traversed between source and destination host pairs 14. In some examples, the bandwidth-allocation module 94 may be further operable to receive traffic reports 68 from the multiple flow agents 62 and to make bandwidth assignments 56 that meet needs indicated in the traffic reports 68 while remaining within bandwidth constraints indicated by the virtual network overlay 70. Further details and additional aspects are discussed below, with respect to the following figures, for creating and/or utilizing a single-path, logic layer in a multipath network.

Figure 7:
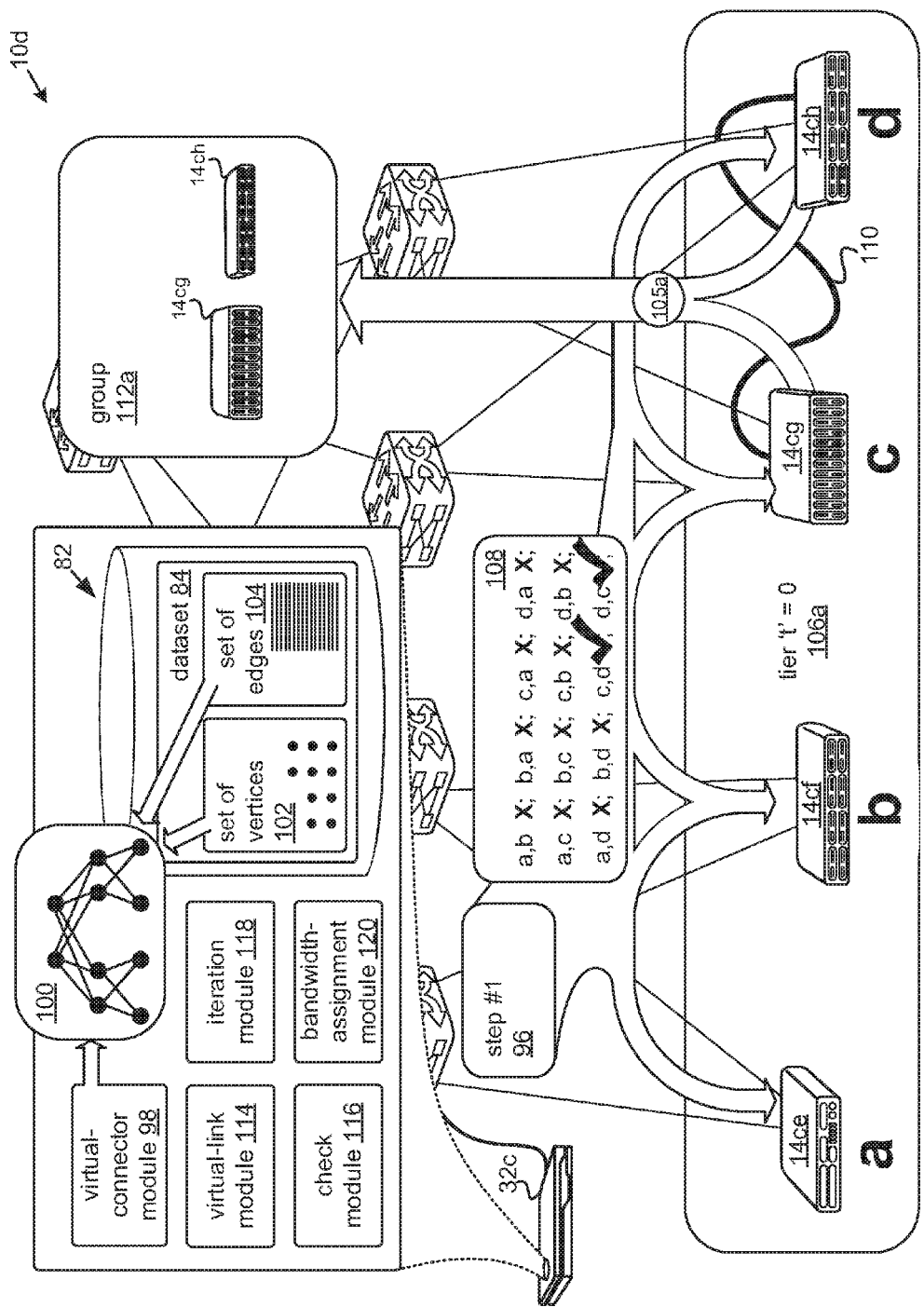
FIG. 7 is a schematic block diagram of the commencement of the creation of the virtual/logical overlay for a tiered datacenter at a base tier, including grouping network nodes connected within a common tier, in accordance with examples.

Referring to FIG. 7, a potential first step 96 in a process of generating a virtual network overlay 70 is depicted. The controller 32c, virtual-node module 86, or some other module, such as a virtual-connector module 98, may be operable to access and/or generate a graph 100 of network nodes 12ah-am/14ce-ch and network links 16 for a datacenter 10d having a tiered topology with the sets of vertices 102, representing network nodes 12ah-am/14ce-ch, and edges 104, representing network links 16, in the dataset 84 maintained by the database 82. Based on this graph 100, the controller 32c, virtual-node module 86, or some other module, such as a virtual-connector module 98, may group 105a network nodes 12/14 in a base tier, reference tier, or common tier 106, which may initially pertain to a tier 71-0 most distant from the core tier 71-3. In such a scenario, as depicted in FIG. 7, the network nodes 14ce-ch may also be hosts 14ce-ch.

According to this first step 96, each host 14ce-ch in the reference tier 106a is checked to see if it is connected to each of the hosts 14ce-ch also in the reference tier 106a. In some examples, the presence of a link 16 may be tested in both directions, as demonstrated by the table 108. In other examples, a check in one direction may be sufficient, such as in examples where all links 16 are bidirectional. In the table 108, individual network nodes 14ce-ch are respectively represented by 'a,' 'b,' 'c,' and 'd,' with directionality following the order in which these letters are stated. Whereas absence of a link 16 within the common tier 106a is indicated with an 'x,' the presence of a connection 110a between two hosts 14 is indicated by a checkmark, as is the case for host 14cg, or 'c,' and host 14ch, or 'd.'

Although all the nodes 12ah-am/14ce-ch in the datacenter 10d may be indirectly reached through connections to nodes in other tiers 71-1-d, during this first step 96 only nodes linked to one another by network links 110a within the common tier 106a are grouped. For example, the network link 110a between host 14cg, or 'c,' and host 14ch, or 'd,' does not traverse tiers 71, but rather provides a connection 110a within the base tier 106a. Hence, according to this first step 96, host 14cg, or 'c,' and host 14ch, or 'd,' may be grouped 105a together in a common group 112a, which, depending on the example, may include any number of network nodes 12/14 and may pertain to a set of groups of any number of elements.

Additional modules, similar to modules 88-94 in the previous figure, but with potential functionalities and/or differences discussed below, are also depicted. Examples of such modules may include a virtual-link module 114, a check module 116, an iteration module 118 and/or a bandwidth-assignment module 120. For purposes of discussing such modules, potential additional and/or alternative functionalities of the virtual-connector module 98 are discussed below for a potential second step 122, with help from the following figure.

Figure 8:
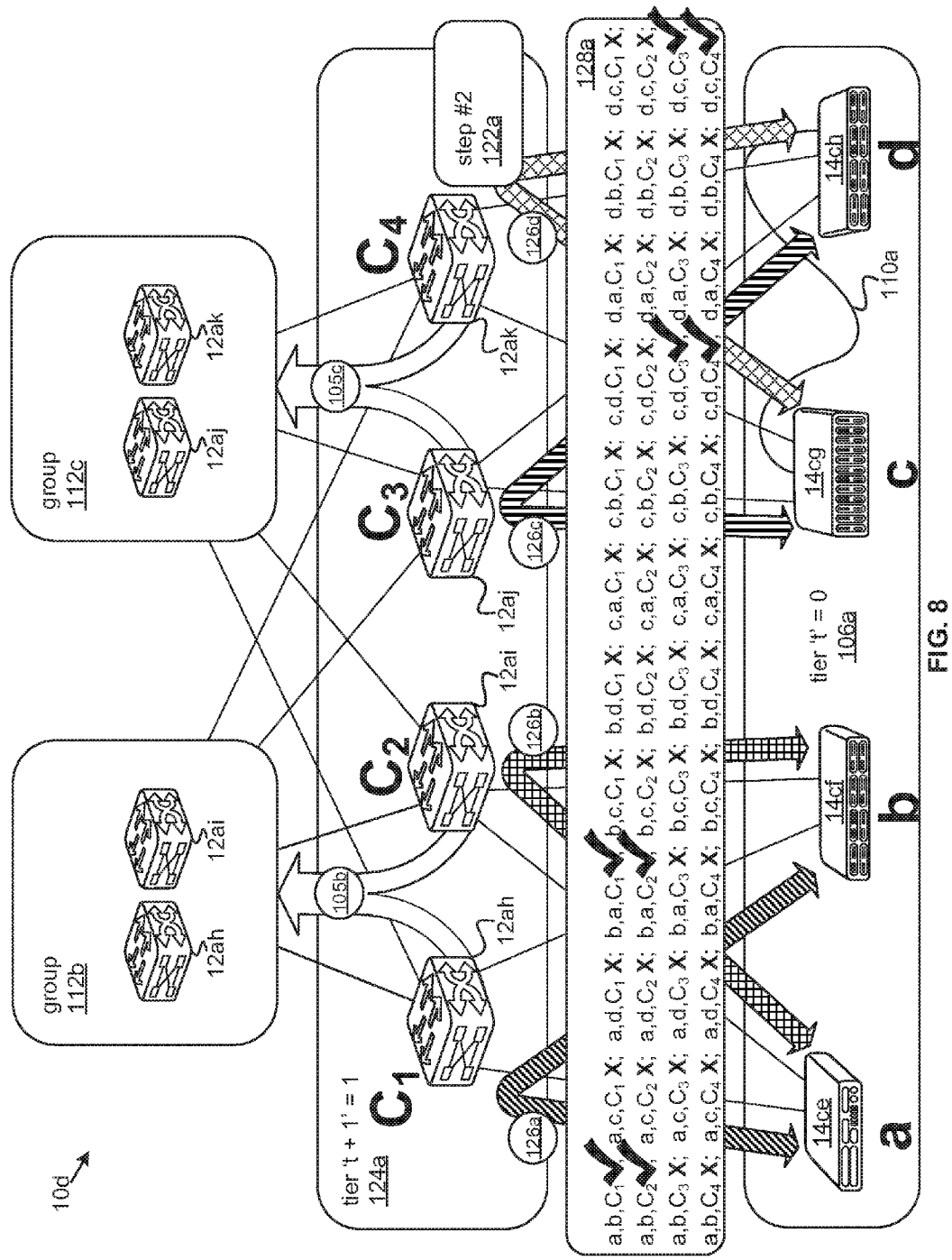
FIG. 8 is a schematic block diagram of an additional step in the creation of the virtual/logical overlay for a tiered datacenter, including grouping network nodes from a consecutive tier connecting common source and destination nodes from a reference tier one step further from a core tier than the consecutive tier, in accordance with examples.

Referring to FIG. 8, a second, potential step 122a is depicted. Again, the controller 32, virtual-node module 86, or other module(s), such as a virtual-connector module 98, may execute the second, potential step 122a on the graph 100 from the dataset 84. During execution, the controller 32 and/or module(s) may group 105b-c network nodes 12ah-ak assigned to a second, successive, or consecutive tier 124.

The consecutive tier 124a may be one step up the datacenter's tiered topology from the base tier 106a. In such cases, the base tier 106a may be denoted as 't,' and the consecutive tier 124 as 't+1.'

Group(s) 112 may be generated in the consecutive tier 124 constrained to network nodes 12 ah-ak connecting pairs of groups 112a-c, each group 112a-c in the base tier 106a from the base tier 106a by an two-tier path 126a-d constrained to the base tier 106a and the consecutive tier 124a. As a non-limiting example, determinations may be made about whether network nodes 12ah-ak in the second tier 124a provide a two-tier path 126 between different source/destination pairs of nodes 12/14, and/or group(s) 112, from the reference tier 106a. In the example depicted by table 128a, each of the network nodes 12ah-ak in the successive tier 124a are checked for paths 126a-d between each potential pairing in the base tier 106a, no path 126 denoted with an 'x' and a path 126 with a check mark.

In the second table 128a, network nodes 14ce-14ch in the base tier 106a are respectively denoted as 'a,' 'b,' 'c,' and 'd.' Network nodes 12ah-ak in the second tier 124a are respectively denoted as '$C_1$,' '$C_2$,' '$C_3$,' and '$C_4$.' Although paths 126 may be searched in both directions, as in table 128a, in some examples, one direction may suffice.

In FIG. 8, a first two-tier path 126a between source-destination pair a-b runs through network node $C_1$. A second two-tier path 126b runs between the same pair a-b through network node $C_2$. Hence, the controller 32 and/or module(s) may group 105b network nodes $C_1$ and $C_2$ in a group 112b for pair a-b, pertaining to the tier 71-1 currently serving as successive tier 124. Two other paths 126c-d pertain to the source-destination pair c-d, running respectively through network nodes $C_3$ and $C_4$, which may also be grouped 105c in another group 112c for pair c-d.

In the depicted example, grouping 105b-c of network nodes 14ce-ch in the successive tier 124a is performed for source-destination pairs defined as network nodes 14ce-ch. Additionally, the controller 32 and/or module(s) may group 105 network nodes 12/14 in the successive tier 124 by two-tier paths 126 through the second tier 124 between source-destination pairs in the reference tier 106 defined as groups 112, or virtual nodes 72. Also, where multiple network nodes 12/14 in the successive tier 124 maintain links 16 to a common group 112, as in relation to the common group 112a of the previous figure, the controller 32 and/or module(s) may group 105 those network nodes, $C_3$ and $C_4$, in a group 112c.

Figure 9:
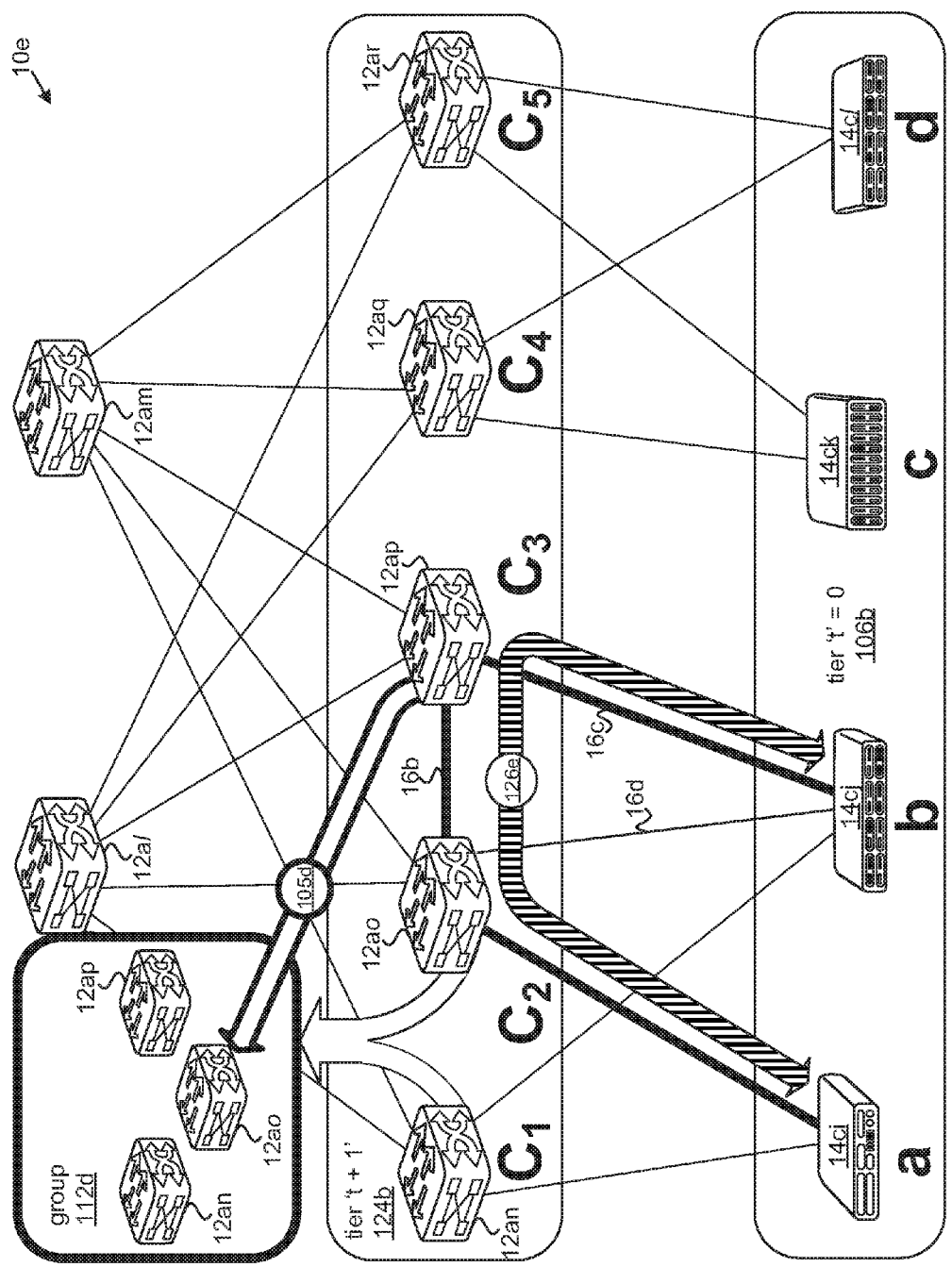
FIG. 9 is a schematic block diagram of an additional aspect of the step of grouping network nodes from a consecutive tier connecting common source and destination nodes from a reference tier where a network node within the consecutive tier may indirectly participate in the connection of the common source and destination nodes, in accordance with examples.

Referring to FIG. 9, an additional aspect is depicted for grouping network nodes 12/14 from a consecutive tier 124b of a datacenter 10e. In the previous figure, a network node 12ah-ak from the successive tier 124a is added to a group 112b-c for a source-destination pair in the reference tier 106a if the network node 12ah-ak directly connects the source-destination pair. However, the controller 32 and/or module(s) may also group 105 one or more additional network nodes 12/14 in a given group 112 where the additional network node(s) 12/14 play a role in and/or contribute to an indirect, two-tier path 126 between a the source-destination pair corresponding to the given group 112.

For example, in FIG. 9, yet another datacenter 10e is depicted, this time with five network nodes 12an-ar in the successive tier 124b, as opposed to the previous four 12ah-ak. As before, network nodes 14ci-cl in the reference tier 106b are consecutively denoted as 'a,' 'b,' 'c,' and 'd,' and network nodes 12an-ar in the second tier 124b are respectively denoted as '$C_1$,' '$C_2$,' '$C_3$,' '$C_4$,' and '$C_5$.' Two different two-tier paths 126 can be described directly between network nodes 'a' and 'b' in the common tier 106b that respectively pass through only one of network nodes '$C_1$' and '$C_2$,' similar to those depicted with respect to the previous figure. Hence, according to the second step 122a, network nodes '$C_1$' and '$C_2$' may be combined in a common group 112d.

However, network node '$C_3$' maintains a link 16b with network node '$C_2$' and a link 16c with network node 'b.' Consequently, a third, albeit indirect, two-tier path 126e may be described between the source-destination pair a-b that includes network node '$C_3$' and the link 16a between '$C_3$' and '$C_2$.' Additionally, in a scenario where network node '$C_2$' does not maintain a link 16d between itself and network node 'b,' both '$C_2$' and '$C_3$' could be included in the group 112d for, together, providing what would be a second path 126e between source-destination pair a-b.

In some examples, network nodes 12/14 playing a role in and/or contributing to an indirect two-tier path 126 for a given source-destination pair may be included in a corresponding group 112 during the second step 122a. Additionally, and/or in the alternative, the network nodes 12/14 playing a role in and/or contributing to an indirect path 126 for the given source-destination pair may be included in the corresponding group 112 during another application of the first step 96 to the tier 71-1 currently serving as the consecutive tier 124, but later serving as the reference tier 106 during a proximate iteration of steps, as discussed further below, once potential remaining steps are discussed.

Figure 10:
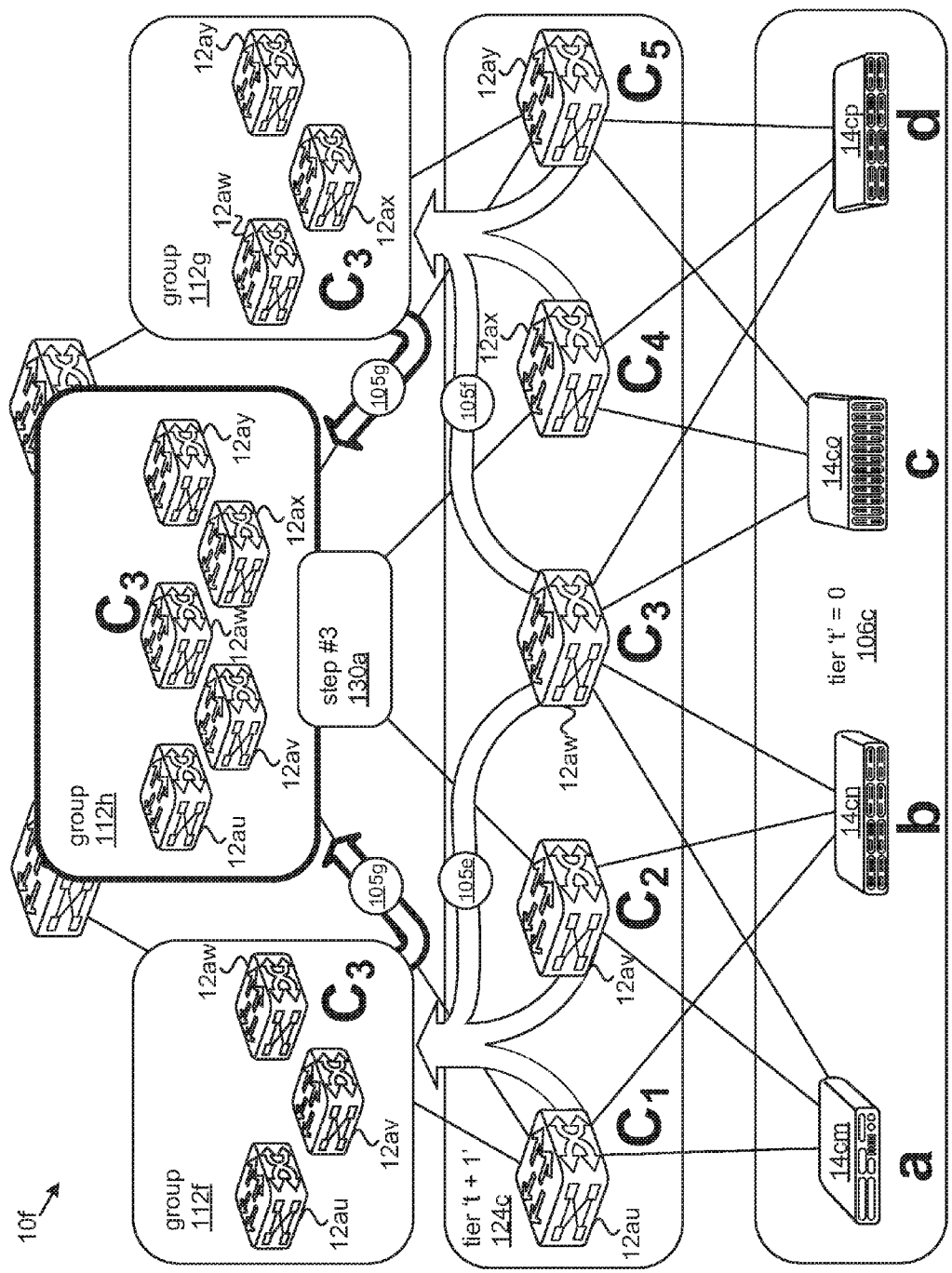
FIG. 10 is a schematic block diagram of yet another potential step in the creation of the virtual/logical overlay for a tiered datacenter, including further grouping groups of network nodes that share a common network node, in accordance with examples.

Referring to FIG. 10, a potential third step 132 is depicted. During execution of the third step 130a, the controller 32 and/or module(s) may merge groups 112 in, or pertaining to, a shared tier 71 that share a common network node 12/14. With respect to the additional datacenter 10f depicted in FIG. 10, network nodes 14cm-cp in the reference tier 106c are consecutively denoted as 'a,' 'b,' 'c,' and 'd,' and network nodes 12au-ay in the second tier 124c are respectively denoted as '$C_1$,' '$C_2$,' '$C_3$,' '$C_4$,' and '$C_5$.' Network node '$C_3$' maintains a link 16 with each network node 14cm-cp in the base tier 106c.

Consequently, network node '$C_3$' may be grouped 105e,f with both network nodes '$C_1$' and '$C_2$,' in group 112f, and with network nodes '$C_4$' and '$C_5$,' in group 112g. Additionally, although not depicted, to avoid crowding the depiction in FIG. 10, network node '$C_3$' may be grouped 105 by itself as the sole network node 12/14 in four additional groups 112 for source-destination pairs between network nodes a-c, a-d, b-c, and b-d. However, since each of these groups 112 contain network node '$C_3$,' they may be merged 130a pursuant to a step 3 into a new group 112h, which would contain all of the network nodes 12au-ay in the successive tier 124c. However, in many examples, merging of nodes 112 may not produce a single node for an entire tier.

Figure 11:
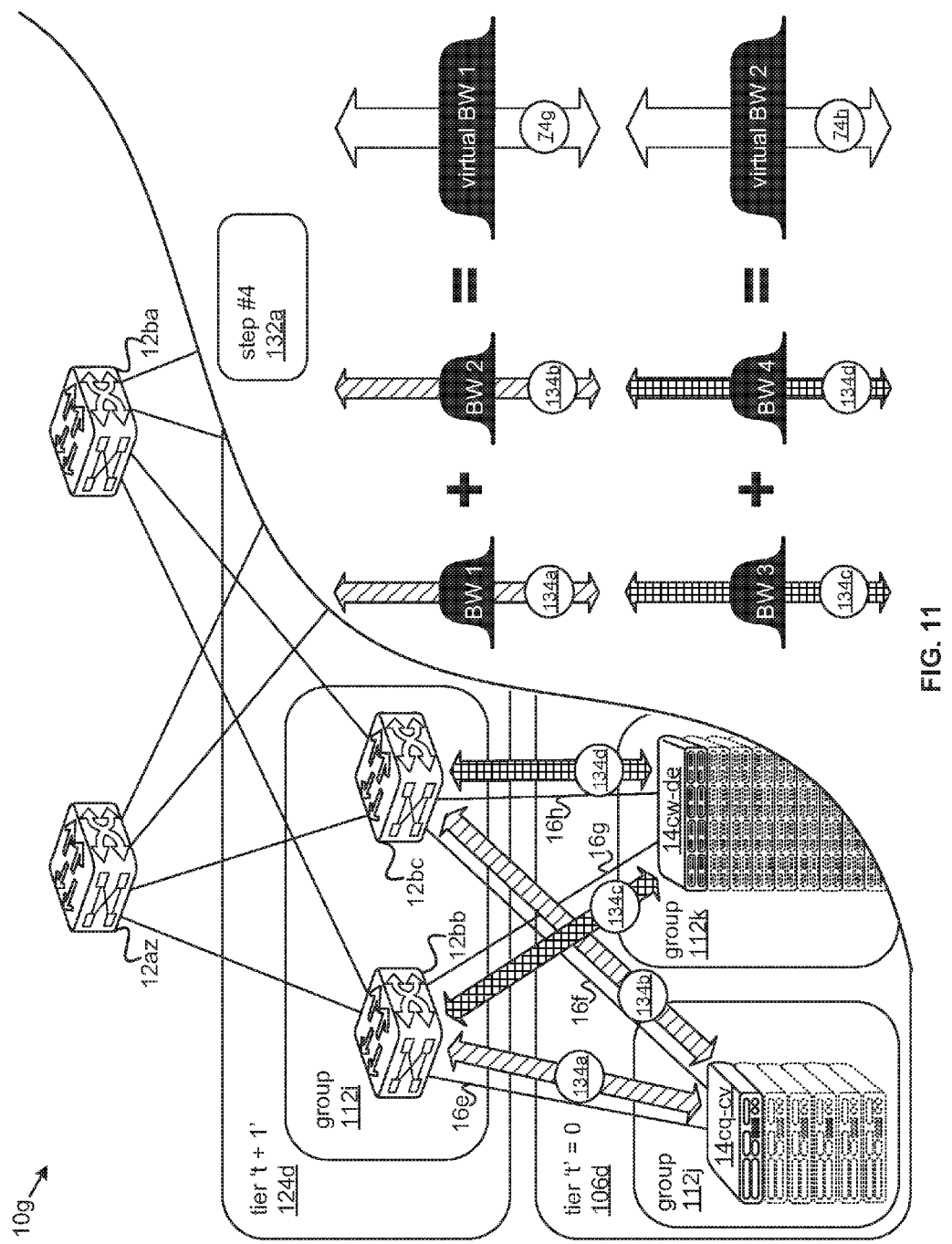
FIG. 11 is a schematic block diagram of a step of summing available bandwidths in network links between groups of network nodes to define bandwidths for virtual links in a virtual overlay, in accordance with examples.

Referring to FIG. 11, a potential fourth step 132 is depicted. Pursuant to this fourth potential step 132a, the controller 32 and/or one or more modules, such as, without limitation, the virtual-link module 114, may be operable to combine bandwidth capabilities 134a-d of network links 16e-h to define virtual links 74g-h between groups 112i-k, or virtual nodes 72, in the base tier 106d and the consecutive tier 124d. For example, and without limitation, the controller 32 and/or module(s) may sum bandwidths in network links 16e-h between groups 112i-k of network nodes 12bb-bc; 14cq-de to define virtual links 74g-h, in terms of their bandwidths, for a virtual overlay 70.

In the figure, network nodes 12bb and 12bc belong to a common group 112i in the consecutive tier 124d. Similarly, network nodes 14*cq-cv* belong to a first common group 112*j*, and network nodes 14*cw-de* belong to a second common group 112*k*, both of which may pertain to the base tier 106*d*. Multiple network links 16*e-f* are depicted, together with their available bandwidths 134*a-b*, between the group 112*i* in the successive tier 124*d* and the first group 112*j* in the reference tier 106*d*. Likewise, multiple network links 16*g-h* are depicted, together with their available bandwidths 14*c-d*, between the group 112*i* in the successive tier 124*d* and the second group 112*k* in the reference tier 106*d*.

Consequently, pursuant to the fourth potential step 132*a*, the available bandwidths 134*a-b* on the two links 16*e-f* between the group 112*i* in the successive tier 124*d* and the first group 112*j* in the reference tier 106*d* may be summed to generate a virtual link 74*g*, which may be defined in terms of the combined bandwidth between the two groups 112*i*, 112*j*, which may become virtual nodes 72 in a virtual overlay 70. In like manner, the available bandwidths 134*c-d* on the two links 16*g-h* between the group 112*i* in the successive tier 124*d* and the second group 112*k* in the reference tier 106*d* may be summed to generate another virtual link 74*h*. Although in the example depicted herein, the virtual links 74*g-h* are bidirectional, in some examples, one or more virtual links 74 may be unidirectional. In addition to the virtual links 74, virtual nodes 72 may be used in a virtual overlay 70.

Figure 12:
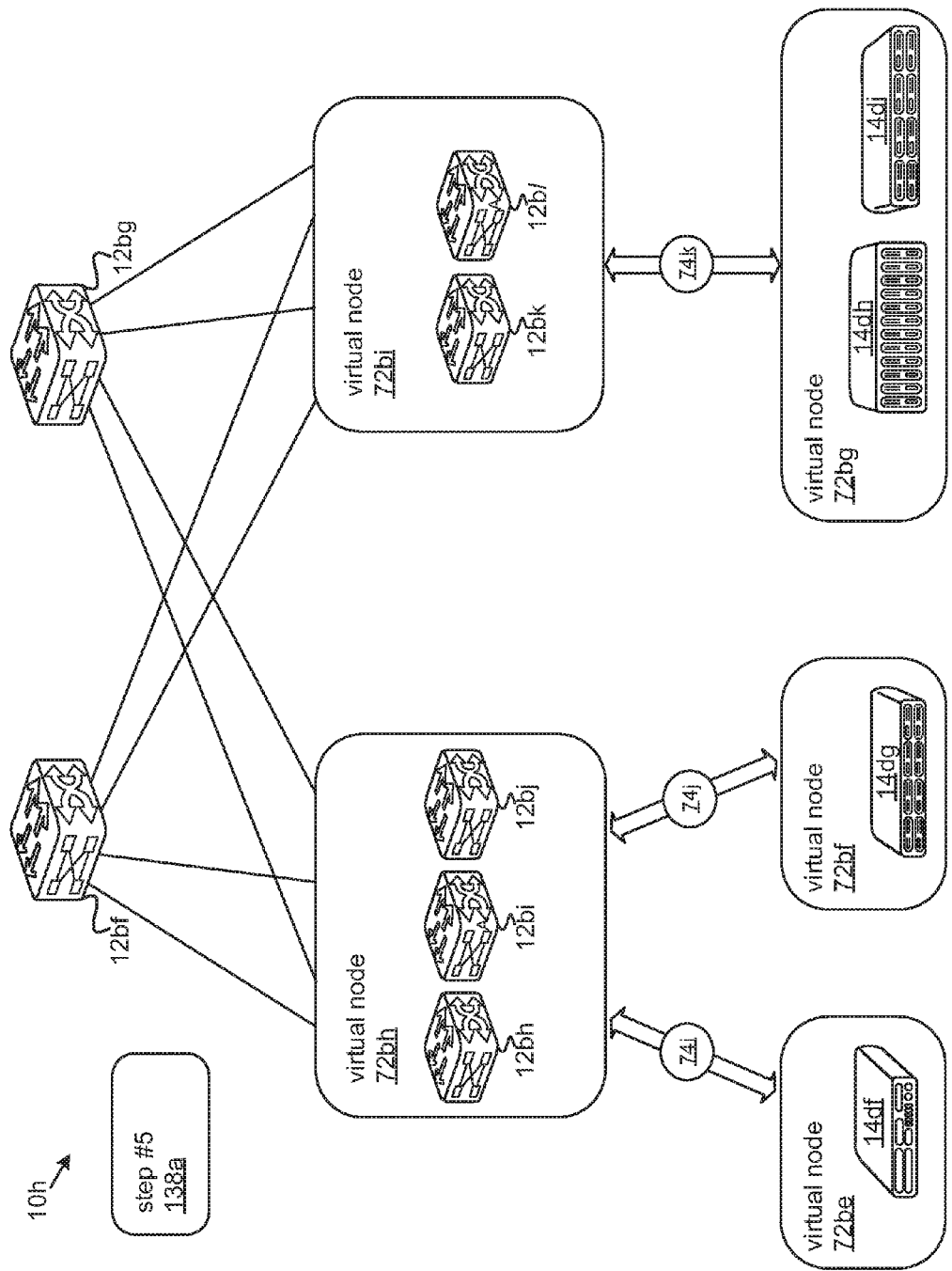
FIG. 12 is a schematic block diagram of a logical/virtual overlay after a first iteration of overlay creation, including virtual nodes, which may be designated pursuant to a potential step from groups of network nodes, and virtual links, together with network nodes and network links at tiers for which the overlay has yet to be produced, in accordance with examples.

Referring to FIG. 12, a potential fifth step 138 is depicted. During execution of this fifth potential step 138*a*, the controller 32 and/or one or more modules, such as without limitation, the virtual-node module 86, may identify groups 112 in the base tier 106 and/or the consecutive tier 124 as a set of virtual nodes 72*be-bi*. This fifth step may be taken after one or more steps, such as, without limitation, steps one through four 96, 122, 130, and 132, or any combination thereof, have been taken to form groups 112 in the reference tier 106 and/or the successive tier 124. Such steps may or may not involve the merging 130 of groups 112.

After a sufficient number of steps have been executed to generate and/or merge groups 112, such as, without limitation, steps one through four 96, 122, 130, and 132, the controller 32 and/or modules may designate groups 112 as virtual nodes 72*be-bi*. As depicted with respect to network nodes 14*df-dg*, in some examples, one or more groups 112 with a single element may be designated as virtual nodes 72*be-bf*. A third virtual node 72*bg* is also depicted with multiple network nodes 14*dh* and 14*di*.

These first three virtual nodes 72*be-bg* may be designated as pertaining to a first tier 71-0. More generally, virtual nodes 72 may be designated as pertaining to a network tier 71 to which the network nodes 12/14 that make them up pertain. Hence, virtual nodes 72*bh-bi* may be designated as pertaining to a second tier 71-1. Within this second tier 71-1, virtual node 72*bh* may be the product of a merger between a first group 112 including network nodes 12*bh* and 12*bi* and a second group 112 including the single network node 12*bj*, along lines similar to those described with respect to FIGS. 9 and 10. Also depicted, are three virtual links 74*i-k* between virtual nodes 72*be-bg* in the base tier 106, corresponding to the first tier 71-0, and virtual nodes 72*bh-bi* in the successive tier 124, corresponding to the second tier 71-1. Once virtual nodes 72 and virtual links 74 have been generated, the controller 32 and/or module(s) may store a record of the virtual nodes 72 and virtual links 74 within the dataset 84 as a set of virtual nodes and a set of virtual links, respectively.

With the designation of the virtual nodes 72*be-bi* for the reference tier 106 and the consecutive tier 124 and the virtual links 74*i-k* between them, a portion of a virtual overlay 70 for a datacenter 10*h* has been generated. However, the virtual overlay 70 has yet to be fully generated. The situation depicted in FIG. 12 depicts the a logical/virtual overlay 70 as far as it may be generated after a first iteration, together with network nodes 12*bf-bg* and network links 16 at tiers 71-3 for which the overlay 70 has yet to be produced.

Figure 13:
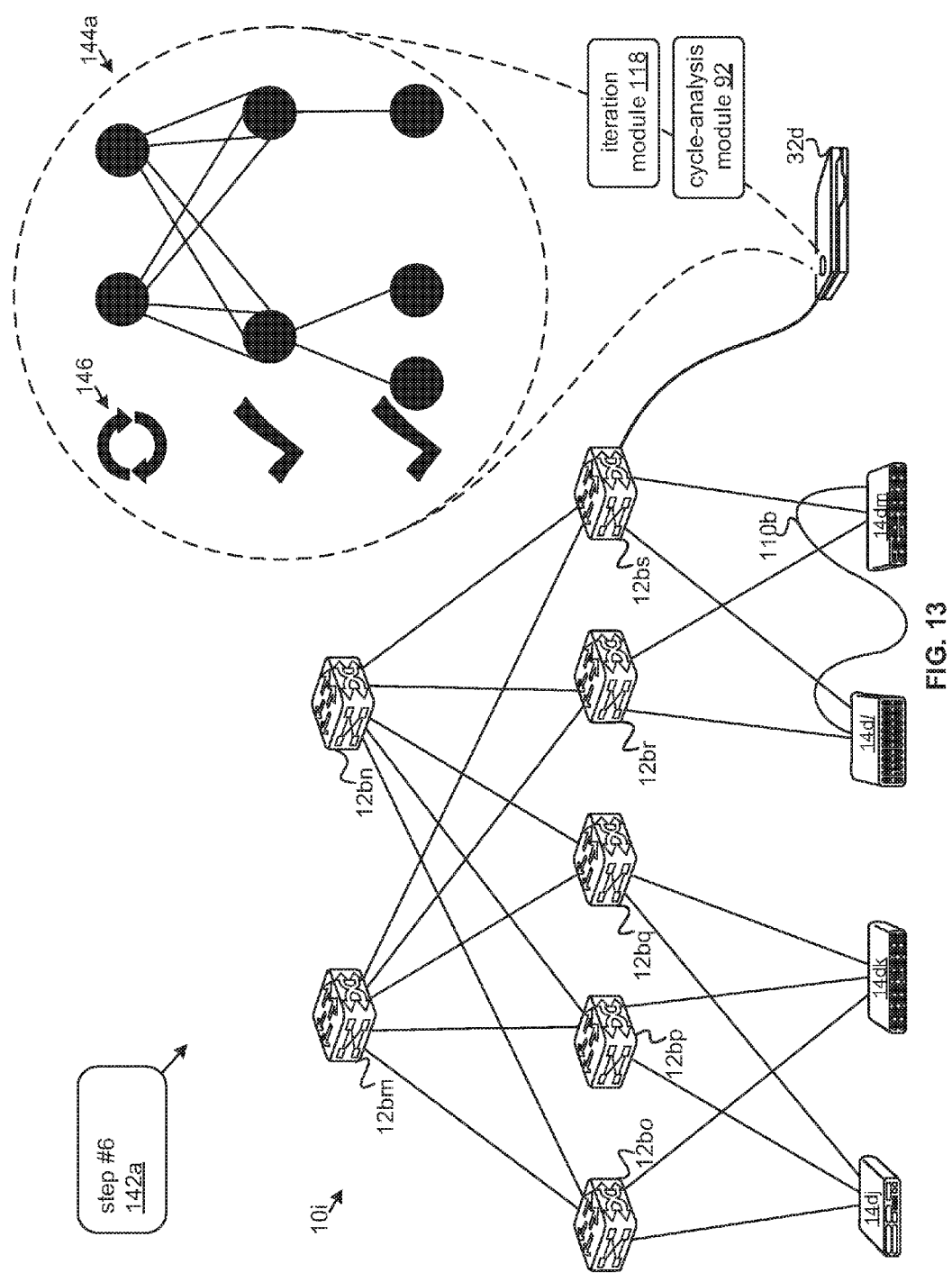
FIG. 13 is a schematic block diagram of a cycle-check module at a controller finding cycles in a graph generated from the virtual nodes and virtual links of the overlay, together with network nodes and network links at tiers for which the overlay has not been generated, after a first iteration of overlay creation, in accordance with examples.

Referring to FIG. 13, a cycle-analysis module 92 is depicted at a controller 32*d* communicatively coupled with a datacenter 10*i*. The controller 32*d* and/or one or more additional modules, such as, without limitation, the cycle-analysis module 92 and/or the check module 116, may be operable to carry out a potential sixth step 142. In accordance with this potential sixth step 142*a*, the controller 32*d* and/or module(s) 92, 116 may be operable to combine virtual nodes 72 and virtual links 74 as vertices and edges respectively for tiers 71 relative to which virtual nodes 72 and virtual links 74 have been respectively identified and defined. In combining virtual nodes 72 and virtual links 74, the controller 32*d* and/or module(s) 92, 116 may construct a cycle-analysis graph, or composite graph, 144*a*.

In many examples, the cycle-analysis graph 144*a* may be a composite of virtual nodes 72 and virtual links 74 at tiers 71 and communication channels for which they have been generated and network nodes 12/14 and network links 16 at tiers 71 and communication channels for which virtual nodes 72 and virtual links 74 have not been defined, identified, and/or generated. In generating the cycle-analysis graph 144*a*, the controller 32*d* and/or module(s) 92, 116 may retrieve information about virtual nodes 72 and virtual links 74 from the set of virtual nodes and the set of virtual links in the dataset 84. Additionally, the controller 32*d* and/or module(s) 92, 116 may retrieve information about network nodes 12/14 and network links 16 from the set of vertices 102 and the set of edges 104 in the dataset 84.

Once the cycle-analysis graph 144*a* has been generated, the controller 32*d* and/or module(s) 92, 116 may check the graph 144*a* for a cycle, or loop, 146, indicated by the circling arrows, in the composite graph 144*a*. As can be appreciated from study of the composite graph 144*a* depicted in FIG. 13, no cycles, or loops, 146 are present in the first tier 71-0, the second tier 71-1, or between the first tier 71-0 and the second tier 71-1. However, as can also be appreciated, several cycles, or loops, 146 are present between the second tier 71-1 and the third tier 71-3 in the composite graph 144*a*.

Where the cycle-analysis module 92, check module 116, and/or controller 32*d* detect a loop, or cycle, 146 in the graph 144*a*, the controller 32*d*, cycle-analysis module 92, the check module 116, and/or an iteration module 118 may be operable to iterate the base tier 106 and the consecutive tier 124 both one step closer to the core tier 70*c*. Additionally, the controller 32*d* and/or module(s) 92, 116, 118 may trigger previous steps, such as, without limitation, grouping 96, 122, merging 130, identifying, and defining 138 virtual nodes for the base tier 106 and the consecutive tier 124, as iterated. Additionally, updating 142 the graph 144*a* and checking 142 the graph 144*a* for a loop 146 until no loop 146 is found.

Figure 14:
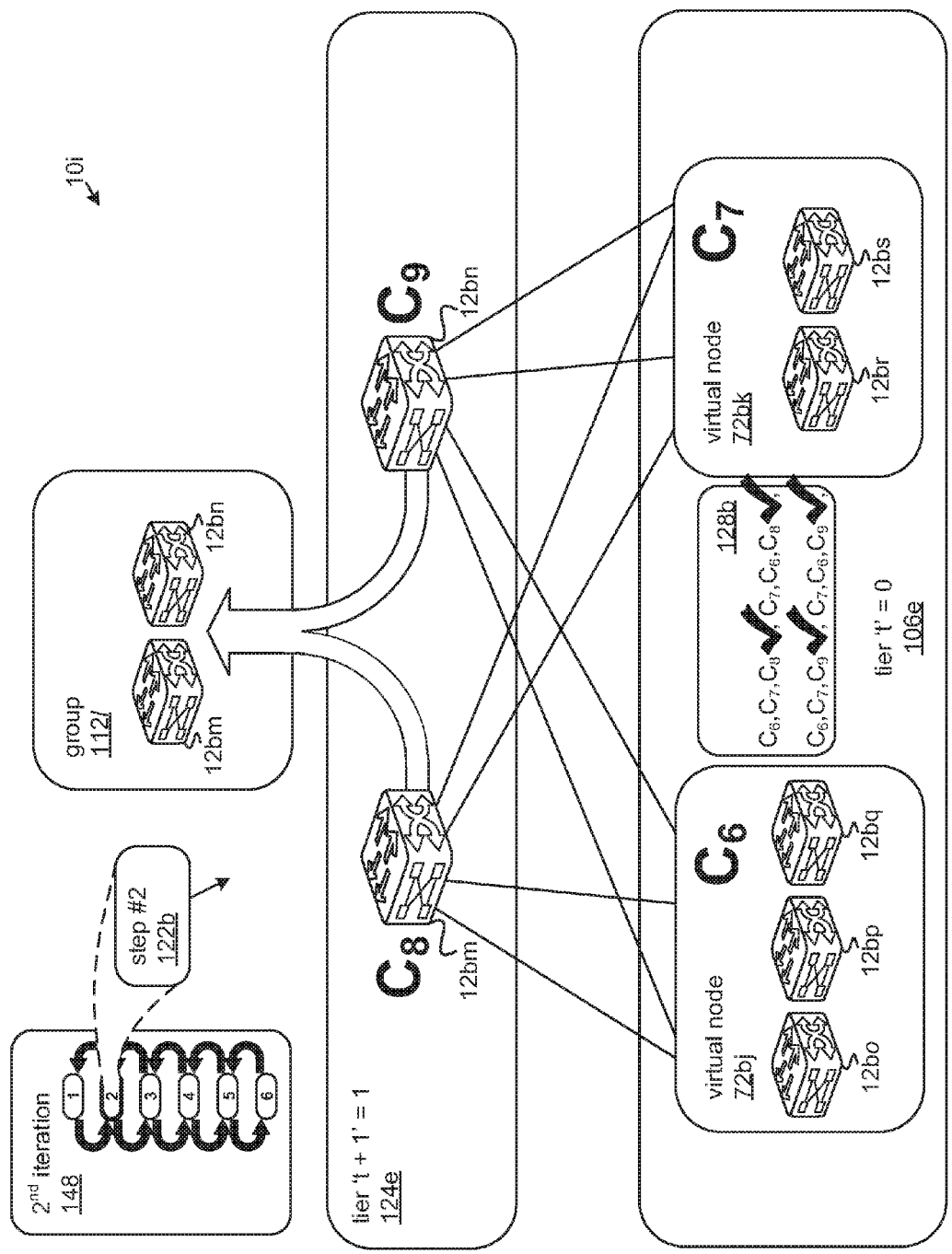
FIG. 14 is a schematic block diagram of a step in a second iteration of overlay creation at augmented reference and consecutive tiers one step closer to a core tier, in particular, the step of grouping network nodes from the consecutive tier connecting common source and destination nodes from the reference tier, in accordance with examples.

Referring to FIG. 14, a portion of the datacenter 10*i* from the previous figure, including the distribution tier 71-2 and the core tier 71-3, is depicted with network nodes 12*bo-bs* from the distribution tier 71-2 grouped in virtual node 72*bj* and virtual node 72*bk*, indicated in table 128*b* as 'C$_6$' and 'C$_7$.' Also, the base tier 106*e* and the consecutive tier 124*e* have been moved up the datacenter topology such that the previous consecutive tier 124 is now the base tier 106*e* and the core tier 71-3 is the present consecutive tier 124*e*. As discussed with respect to the previous figure, now that the base tier 106e and the consecutive tier 124e have been augmented, a second iteration of steps 96, 122, 160, 132, 138 and 142, previously performed on lower tiers 71-0-71-1, may be commenced. Depending on whether the first step 96 may or may not be applicable, it may be executed or skipped, as in the scenario depicted in FIG. 14.

Hence, FIG. 14 depicts a second instance of the second step 122b of grouping network nodes 12bm-bn, indicated in table 128b as 'C$_8$' and 'C$_9$,' in the consecutive tier 124e that create two-tier paths 126 between different source-destination pair in the reference tier 106e. However, during this second iteration 148, the source-destination pairs may be made of groups 112 and/or virtual nodes 72bj-bk. In some examples, although a group 112 have already been identified as a virtual node 72, it may be merged with other group(s) 112 and/or virtual node(s) 72 during later iterations. As can be appreciated, both network nodes 12bm-bn in the consecutive tier 124e, or core tier 71-3, provide network links 16 that create communication paths between both virtual nodes 72bj-bk in the reference tier 124e. Consequently, both network nodes 12bm-bn in the consecutive tier 124e may be combined, or grouped in a new group 112/assigned to the core tier 71-3. Generation of the virtual network overlay 70 may then proceed with one or more additional steps pursuant to the second iteration 148.

Figure 15:
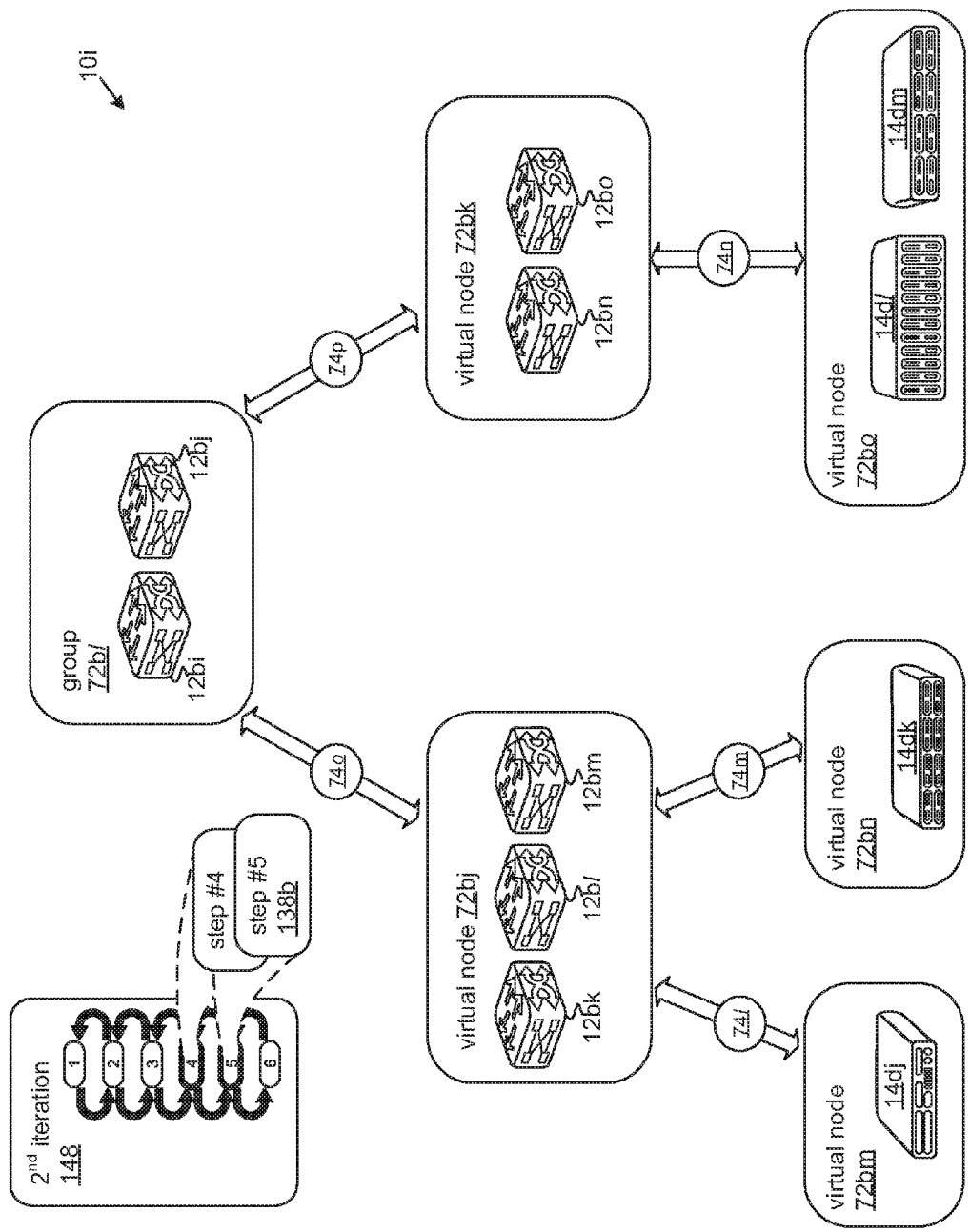
FIG. 15 is also a schematic block diagram of steps in a second iteration of overlay creation, in particular, the steps of summing available bandwidths in network links between groups of network nodes to define bandwidths for virtual links and defining groups of network nodes as virtual nodes for a virtual overlay, in accordance with examples.

Referring to FIG. 15, the datacenter 10i of the previous two figures is again depicted, in terms of a virtual network overlay 70 being generated for the datacenter 10i, as the second iteration 148 progresses. In the figure, the second iteration has skipped a potential third step 160, which may or may not be applied in examples, depending on whether this third step 160 is applicable. Additionally, the figure depicts results from instances of a potential fourth step 132b and a potential fifth step 138b.

Consequently, during a second iteration 148 for creation of the logic overlay 70, the network links 16 from the group 112l (depicted in the previous figure) formed for the core tier 71-3 are summed to define virtual links 74o-p between the core group 112l and each of the virtual nodes 72bj-bk in the distribution layer 71-2. Also, pursuant to the second instance of the potential fifth step 138b, the core group 112l has been designated as a new virtual node 72bl. At this point of the creation of a virtual overlay 70, the second iteration 148 may proceed to another instance of the sixth step 142b of checking for cycles 146.

Figure 16:
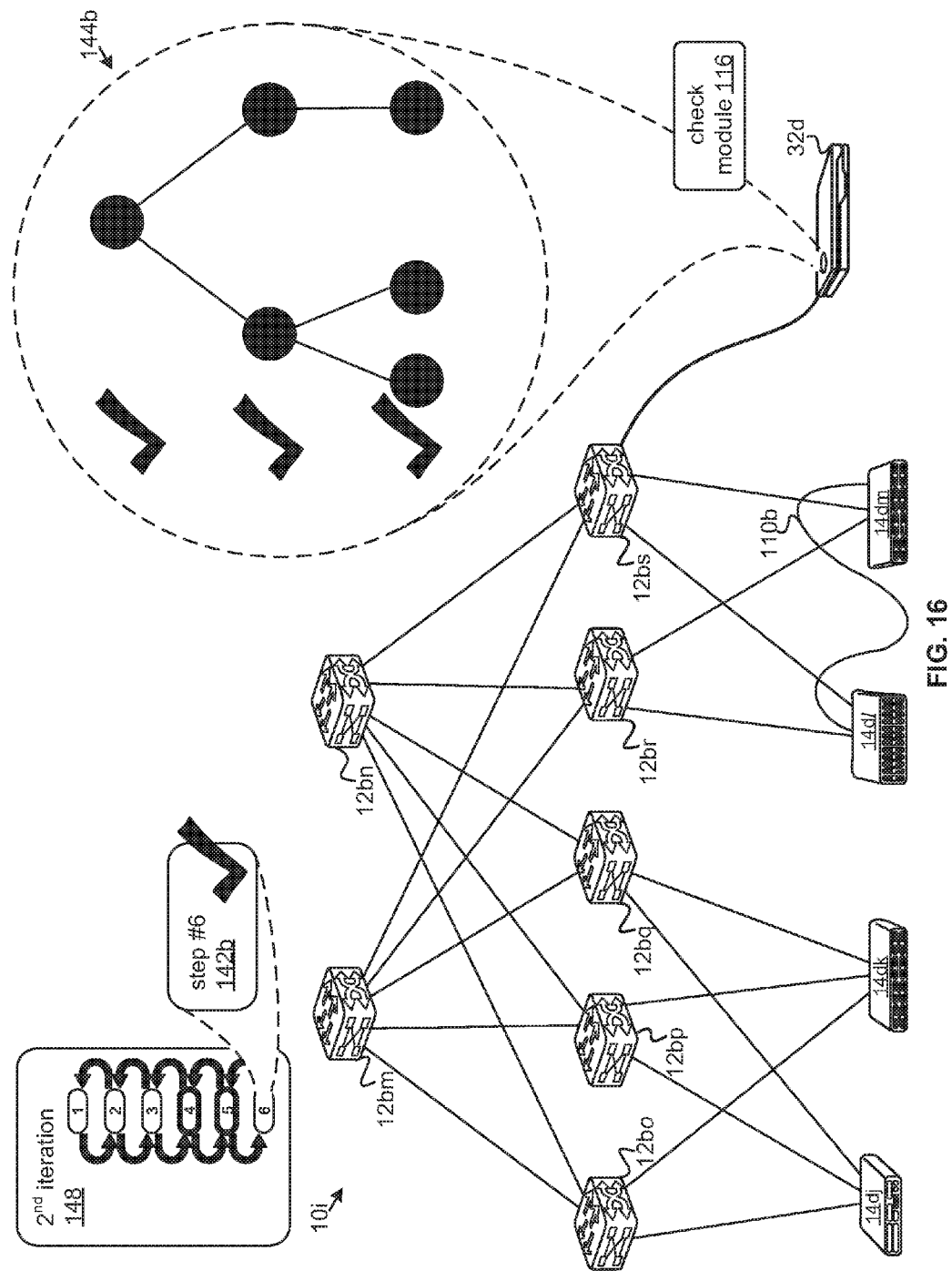
FIG. 16 is a schematic block diagram of a step in a final iteration of overlay creation, in particular, the step of checking for a cycles in a graph of the completed overlay, in which no cycles are found, in accordance with examples.

Referring to FIG. 16, the same datacenter 10i of the previous figures is depicted yet again in relation to the application of an instance of the sixth potential step 142b during the second iteration 148. Again, the controller 32d and/or one or more additional modules, such as, without limitation, the cycle-analysis module 92 and/or the check module 116, may execute this instance of the sixth step 142b generating a second instance of the composite graph 144b from information in the dataset 84.

As can be appreciated from the second instance of the composite graph 144b, the cycles 146 present in the first instance of the composite graph 144a between the core tier 71-3 and the distribution tier 71-2 have been removed during the second iteration 148. Therefore, in a sense, the composite graph 144b is no longer composite inasmuch as it may be generated solely from the set of virtual nodes and the set of virtual links in the dataset 84. Once the controller 32d and/or module(s) 92, 116 are no longer able to detect the presence of a loop, or cycle, 146, an additional iteration may be foregone.

The virtual network overlay 70 may be certified complete and ready for use. Although two iterations 148 were required to remove all cycles 146 from the composite graph 144, any number of iterations 148 may be engaged in to remove cycles 146, depending on the nature of the corresponding datacenter 10. As can be appreciated from the second instance of the composite graph 144b, the resultant virtual network overlay 70 allows for a single path between each pair of source and destination nodes in the layer most removed from the core tier 71-3.

Figure 17:
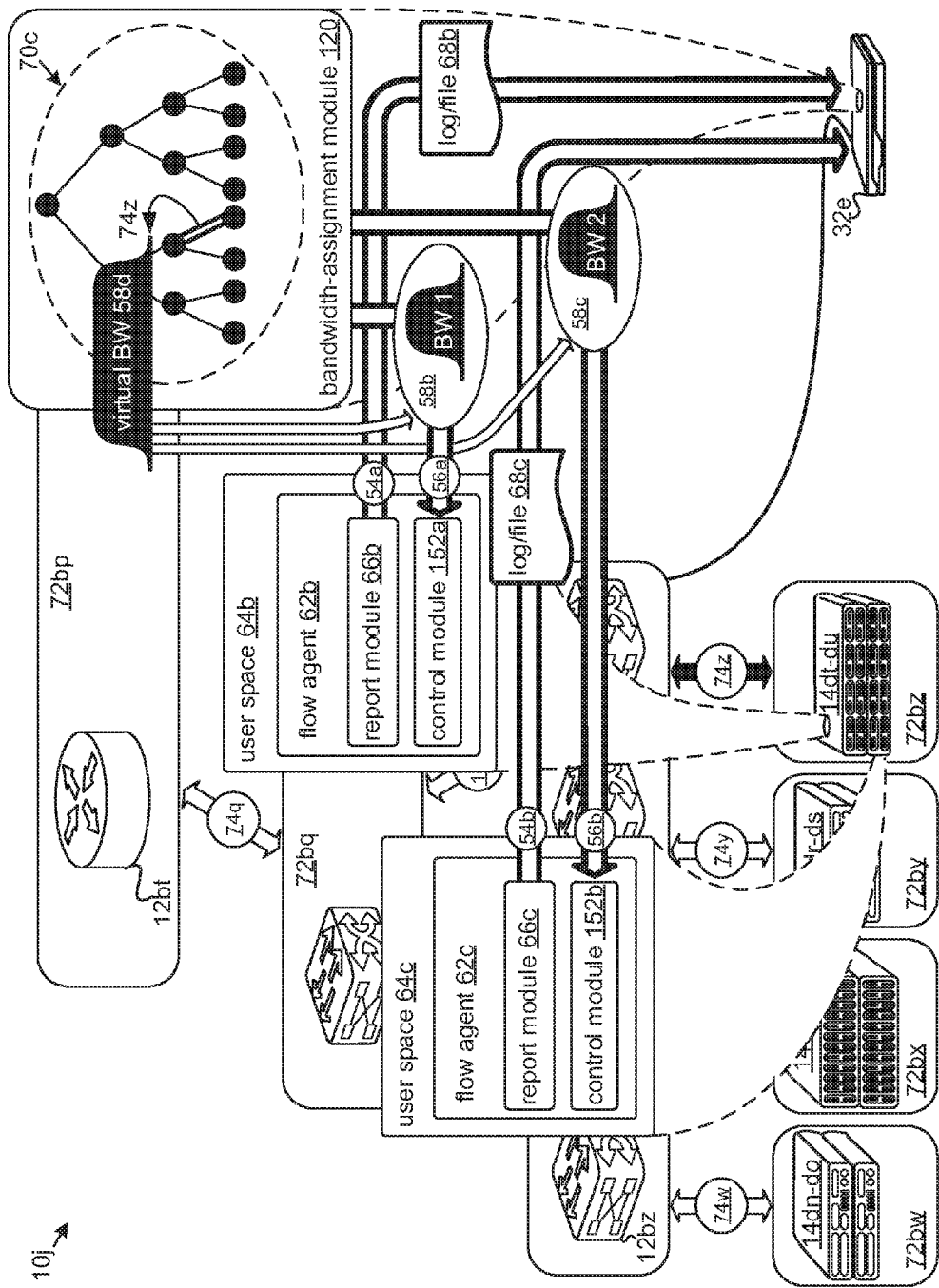
FIG. 17 is a schematic block diagram of a bandwidth-assignment module at a controller, the bandwidth-assignment module operable to make bandwidth assignments, informed by a virtual overlay, to flow agents at individual hosts, in response to anticipated traffic needs reported by the flow agents, in accordance with examples.

Referring to FIG. 17, the controller 32e is depicted with a module, such as, without limitation, a bandwidth-allocation module 94 and/or bandwidth-assignment module 120, operable to assign bandwidths 58 to single paths within a logical layer between pairs of hosts 14 in a datacenter 10. The logical layer may be defined in terms of a virtual overlay 70c. Furthermore, bandwidth assignments 56 may be made using the bandwidths 58 for virtual links 74 in the logical layer to prevent over allocation.

The datacenter 10j depicted in FIG. 17 is depicted in terms of a portion of the virtual nodes 72bp-bt and virtual links 74q-z of the virtual overlay 70c. Additionally, user spaces 64b-c are depicted from two different hosts 14dt-du pertaining to a common virtual node 72bz with a single virtual link 74z, depicted with solid black fill. Each user space 64b,c is depicted with a flow agent 62b,c, each of which may include a report module 66 and/or a Traffic-Statistic-Gathering (TSG) module 150a,b, and/or a control module 152a,b. As can be appreciated, other hosts 14 in the datacenter 10j may also have such flow agents 62 and modules 66, 150, 152.

Multiple TSG modules 150a,b at multiple hosts 14dt-du in the datacenter 10j may be operable to collect data about traffic originating at corresponding hosts 14dt-du. Additionally, such TSG modules 150a,b may communicate 54a,b the data 68b,c to the controller 32e and/or modules 94,120, which may be further operable to assign 56a,b bandwidths 58b,c responsive to the data 68b,c about traffic originating at corresponding hosts 14dt-du.

In addition to responding to the traffic needs of individual hosts 14dt-du, the controller 32e and/or modules 94, 120 may reference the virtual overlay 70c from the dataset 84 to make sure that the combined bandwidths 58b of the virtual links 74 are not exceeded by the bandwidth allocations 56. An example with respect to a single virtual link 74z connected to a virtual node 72bz with two hosts 14dt-du is explored in FIG. 17. In the example, the controller 32e and/or modules 94, 120 may access the virtual bandwidth 58d for the virtual link 58d in question from the virtual overlay 70c. The controller 32e and/or modules 94, 120 may determine two bandwidths 58b,c for allocation 56a,b to the corresponding hosts 14dt-du that together sum to a bandwidth less than or equal to the virtual bandwidth 58d for the virtual link 74z. As can be appreciated, similar allocations may be made for additional virtual links 74 and/or may be updated as frequently as desirable and/or possible.

Also, in some examples, TSG modules 150 may also be operable to classify traffic flows originating at corresponding hosts 14d and to include data about elephant flows 50 in the data 68 about traffic originating at the corresponding hosts 14dt-du. In such examples, the bandwidth-assignment module 120 may be further operable to under allocate 56 bandwidths 58 to the flow agents 62 to leave bandwidth for traffic not pertaining to an elephant flow 50.

Figure 18:
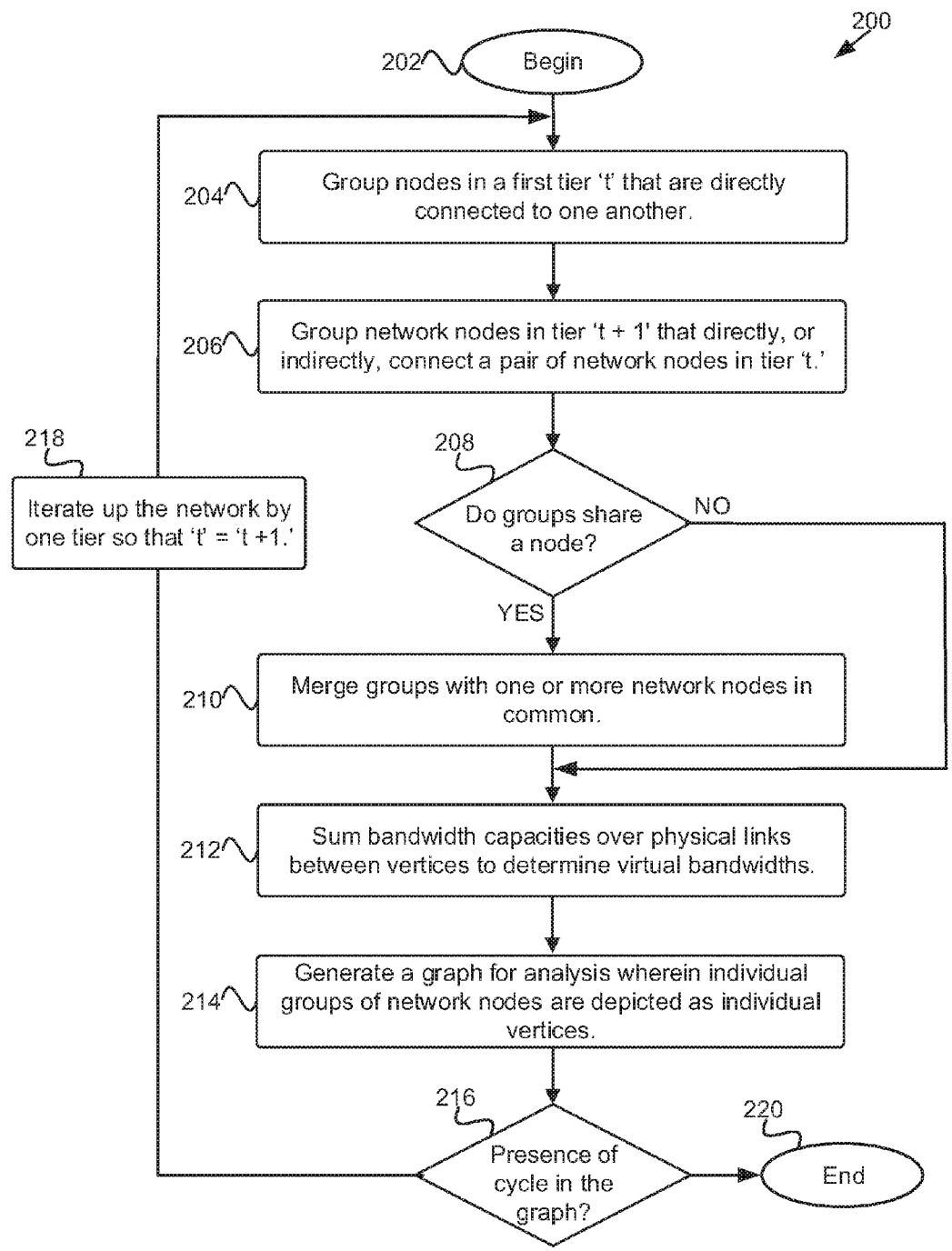
FIG. 18 is a flow chart of steps for generating a logical/virtual, single-path overlay for a controller in a hierarchical datacenter with which bandwidth allocations may be made to improve network traffic while maintaining the advantages of multi-path routing at lower, networking-protocol layers, in accordance with examples.

Referring to FIG. 18, methods 200 for generating and/or utilizing a virtual network overlay 70 are depicted. The flowchart in FIG. 18 illustrates the architecture, functionality, and/or operation of possible implementations of systems, methods, and computer program products according to examples. In this regard, each block in the flowchart may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

Where computer program instructions are involved, these instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block or blocks. These computer program instructions may also be stored in a computer readable medium that may direct a computer to function in a particular manner, such that the instructions stored in the computer-readable medium produce an article of manufacture including instruction means which implement the function/act specified in the flowchart and/or block or blocks. The computer program may also be loaded onto a computer to cause a series of operation steps to be performed on the computer or other programmable apparatus to produce a computer implemented process for the functions/acts specified in the flowchart and/or block or blocks.

It should also be noted that, in some alternative implementations, the functions noted in the blocks may occur out of the order noted. In certain embodiments, two blocks shown in succession may, in fact, be executed substantially concurrently, or the blocks may sometimes be executed in the reverse order, depending upon the functionality involved. Alternatively, certain steps or functions may be omitted. Also, additional disclosures described as systems above may also be implemented as methods and vice versa.

Pursuant to FIG. 18, the method 200 may begin 202 by grouping 204 network nodes 12/14 in a first tier 't' 106 that are directly connected to one another within the first tier 't' 106. In some examples, such grouping 204 may be implemented at a controller 32 with memory and processor and coupled to a datacenter 10 having a hierarchical topology. The controller 32 and/or one or more modules thereat, and/or connected thereto, may identify network nodes 12/14 assigned to the common tier 106 that are connected within the common tier 106 as a virtual node 72, or group 112, for a set of virtual nodes 72, or a set of groups 112.

The method 200 may proceed by grouping 206 network nodes 12/14 in tier 't+1' 124 that directly, or indirectly, connect a pair of nodes 12/14/112/72 in tier 't' 106. For example, the controller 32 and/or module(s) may, as part of identifying a set of virtual nodes, or groups, for a virtual network overlay 70, also identify a virtual node 72, or group 112, as a set of network nodes 12/14 that provide one or more connections 16 between a source node 12/14/112/72 and a destination node 12/14/112/72, both in a common tier 106. Such a set of network nodes 12/14 may be assigned to a successive tier 124 one step higher in the hierarchical topology than the common tier 106. Furthermore, identification of the virtual node 72, or group 112, may be constrained such that the one or more connections, or links, 16, which provide a path from source to destination nodes, are between the common tier 106 and the successive tier 124.

Once groups 112, or virtual nodes 72 have been created, a determination 208 may be made as to whether any of such groups 112, or virtual nodes 72, share a common network node 12/14. In the case that they do, the method 200 may proceed by merging 210 groups 112, or virtual nodes 72, into a common virtual node 72, or group 112, where each of the virtual nodes 72, or groups 112, being merged share one or more network nodes 12/14 in common. The method 200 may then proceed to summing 212 bandwidth capacities 134 over physical, network links 16 between virtual nodes 72, and/or groups 112, to determine virtual bandwidths 58.

Where the answer to the determination 208 is no, the method 200 may forgo merging 210 and proceed directly to summing 212 bandwidth capabilities 134. In summing 212 bandwidth capabilities 134, the controller 32 and/or module (s) thereat, and/or connected thereto, may designate a set of virtual links 74 for the virtual network overlay 70 by summing bandwidths 134 for network links 16 between common virtual nodes 72, or groups 112.

Once a set of virtual nodes 72, and/or groups 112, are generated, together with virtual links 74, the method 200 may continue by generating 214 a graph 144 for analysis. In the graph 144, individual groups 112, or virtual nodes 72, of network nodes 12/14 may be depicted as individual vertices for tiers 71 at which virtual nodes 72, or groups 112, have been identified. Virtual links 74 may be depicted as edges between tiers 71 at which virtual nodes 72, or groups 112, have been identified.

For example, the controller 32 and/or module(s) thereat, and/or connected thereto, may generate 214 a graph 144 with a set of nodes 102 and a set of edges 104. The set of nodes 104 may include a set of nodes for the set of virtual nodes, or groups, and/or a set of nodes for a set of network nodes. The set of nodes for the set of network nodes utilized may include network nodes 12/14 assigned to a set of tiers 71 in the datacenter 10 for which a virtual node 72, or group 112, has not been assigned in the set of virtual nodes, or groups. The set of edges 104 may include a set of edges for the set of virtual links and/or a set of edges for a set of network links. The set of edges for the set of network links may include network links 16 in the datacenter 10 not subject to a virtual-link designation.

Pursuant to the method 200, the graph 144 may be 216 analyzed for a cycle, or loop, 146. In the case where a cycle, or loop, 146 is detected in the graph 144, the method 200 may proceed by iterating 218 up the network topology by one tier 71 and returning to the step of grouping 204 nodes 12/14/112/72 in the new common tier 't' 106. The step of iterating 218 may include, for example, augmenting both the common tier 106 and the successive tier 124 one step higher in the hierarchical topology. Additionally, iterating 218 may entail iterating through method steps 204 through 216, or some combination thereof, for the common tier 106 and the successive tier 124 as newly assigned.

As a result of iterating 218 up the network topology, additional virtual nodes 72, or groups 112, may be identified for the set of virtual nodes for the graph 144. Also, or in the alternative, additional virtual links 74 for the set of virtual links for the graph 144 may be designated. The graph 144 may also be updated with any additional groups 112, virtual nodes 72, and/or virtual links 74. The updated graph 144 may be analyzed 216 again for a cycle 146.

If the answer to the question 216 of cycle 146 presence is yes, the method 200 may continue augmenting the common tier 106 and the successive tier 124 with each iteration 218 for which a cycle 146 is detected. Additionally, previous steps 204-216 may be repeated, until the answer is no, and analysis 216 of the graph 144 does not result in detection of a cycle, or loop, 146. When the answer to the analysis 216 is no, the method 200 may end 220 and a completed virtual network overlay 70, with potentially single-path routing within the virtual network overlay 70, may be utilized to improve network performance within the datacenter 10.

The resultant virtual network overlay 70 may have a hierarchical topology. In the virtual network overlay 70, each virtual node 72, or group 112, may be assigned to a tier 71 in the hierarchical topology corresponding to a tier 71 to which network nodes 12/14 in the virtual node 72, or group 112, are assigned. Also within the virtual network overlay 70, owing to the way in which it has been generated, as described above, each pair of network nodes 14 serving as hosts may have a single path 60 through the virtual network overlay 70.

To utilize the overlay 70, some examples may further include connecting the set of virtual nodes and the set of virtual links to create the virtual network overlay 70. Such examples may proceed by making bandwidth allocations 56 between pairs of network nodes 14 serving as hosts that are consistent with bandwidth capacities of designated virtual links 74 in the virtual network overlay 70. Additionally, or in the alternative, some examples of the method 200 may further include receiving traffic information 68 for the datacenter 10 from the network nodes 14 serving as hosts 14. Such examples may also include informing bandwidth allocations 56 with the traffic information 68 to meet traffic needs in the datacenter 10.

The present disclosures may be embodied in other forms without departing from their spirit or essential characteristics. The described examples are to be considered in all respects only as illustrative, not restrictive. The scope of the invention is, therefore, indicated by the appended claims, rather than by the foregoing description. All changes within the meaning and range of equivalency of the claims are to be embraced within their scope.

The invention claimed is:

1. A system for generating a virtual overlay for a datacenter, comprising:
    a database, on a physical storage medium, maintaining a dataset capable of characterizing a tiered datacenter topology, operable for multipath routing, as a graph with a set of vertices representing network nodes and a set of edges representing network links;
    a controller, comprising memory and a processor, communicatively coupled to the database and operable to:
        access the graph from the dataset;
        create a set of virtual nodes by assigning network nodes, represented in the graph, to virtual nodes;
        create a set of virtual links between the virtual nodes by summing bandwidths of network links directly connected to network nodes in pairs of virtual nodes;
        generate a virtual overlay, with the set of virtual nodes and the set of virtual links, that assigns a single path between a source host and a destination host; and
    a virtual-node module communicatively coupled to the controller and operable, beginning at a tier most removed from a core tier of the datacenter, to:
        select a reference tier and a second tier, the second tier being defined relative to the reference tier and being one step higher on the tiered datacenter topology in a direction toward the core tier, the reference tier and the second tier being subject to reassignment after being used to generate the set of virtual nodes from network nodes; and
        generate the set of virtual nodes from network nodes, a virtual node of the set of virtual nodes comprising at least one network node in the second tier for which a path that includes the at least one network node in the second tier is describable through the datacenter from a corresponding, source node in the reference tier to a corresponding, destination node in the reference tier.

2. The system of claim 1, further comprising a merge module communicatively coupled to the controller and operable to merge, from the set of virtual nodes, multiple virtual nodes sharing at least one common network node into a common virtual node replacing multiple virtual nodes sharing at least one common network node in the set of virtual nodes.

3. The system of claim 2, further comprising a connector module communicatively coupled to the controller and operable to generate a virtual node from network nodes in the reference tier that share a network link.

4. The system of claim 2, further comprising a cycle-analysis module communicatively coupled to the controller and operable to:
    generate a composite graph from a composite set of vertices, comprising vertices for the set of virtual nodes and vertices from the set of vertices assigned to network nodes in a set of tiers for which virtual nodes have not been created, and a composite set of links, comprising edges for the set of virtual links and edges from the set of edges assigned to network links connected to at least one network node in the set of tiers for which virtual nodes have not been created; and
    analyze the composite graph for a cycle in the composite graph.

5. The system of claim 4, wherein the cycle-analysis module is further operable, in response to detection of a cycle, to change the reference tier to the second tier, to move the second tier one additional tier toward the core tier, and to trigger creation of at least one additional virtual node and at least one additional virtual link.

6. The system of claim 1, further comprising:
    multiple flow agents, each flow agent residing at a host and operable to serve as source for a traffic flow in the datacenter and operable to control a bandwidth of the traffic flow from the source for the traffic flow;
    a bandwidth-allocation module communicatively coupled to the controller; the bandwidth-allocation module operable to make bandwidth allocation assignments to the multiple flow agents without exceeding available bandwidth on network links by referencing bandwidths for virtual links in the virtual overlay traversed between source destination pairs.

7. The system of claim 6, wherein the bandwidth-allocation module is further operable to receive traffic reports from the multiple flow agents and to make the bandwidth allocation assignments that meet needs indicated in the traffic reports while remaining within bandwidth constraints indicated by the virtual overlay.

* * * * *